(12) United States Patent
Rothman et al.

(10) Patent No.: US 9,731,221 B2
(45) Date of Patent: Aug. 15, 2017

(54) APPARATUS HAVING POLYMER SURFACES HAVING A SILOXANE FUNCTIONAL GROUP

(71) Applicant: CIDRA CORPORATE SERVICES INC., Wallingford, CT (US)

(72) Inventors: Paul J. Rothman, Windsor, CT (US); Mark R. Fernald, Enfield, CT (US); Francis K. Didden, Wallingford, CT (US); Douglas H. Adamson, Mansfield Center, CT (US)

(73) Assignee: CiDRA CORPORATE SERVICES, INC., Wallingford, CT (US)

( * ) Notice: Subject to any disclaimer, the term of this patent is extended or adjusted under 35 U.S.C. 154(b) by 0 days.

(21) Appl. No.: 14/890,477

(22) PCT Filed: May 13, 2014

(86) PCT No.: PCT/US2014/037823
§ 371 (c)(1),
(2) Date: Nov. 11, 2015

(87) PCT Pub. No.: WO2014/186352
PCT Pub. Date: Nov. 20, 2014

(65) Prior Publication Data
US 2016/0067631 A1 Mar. 10, 2016

Related U.S. Application Data

(63) Continuation-in-part of application No. 14/118,984, filed on Jan. 27, 2014, now Pat. No. 9,302,270.
(Continued)

(51) Int. Cl.
*B01D 15/26* (2006.01)
*B01D 15/20* (2006.01)
*B01J 20/26* (2006.01)

(52) U.S. Cl.
CPC ......... *B01D 15/26* (2013.01); *B01D 15/206* (2013.01); *B01J 20/262* (2013.01)

(58) Field of Classification Search
None
See application file for complete search history.

(56) References Cited

U.S. PATENT DOCUMENTS

| | | | |
|---|---|---|---|
| 1,684,536 A | 9/1928 | Fischer | |
| 1,711,326 A | 4/1929 | Remick | |

(Continued)

FOREIGN PATENT DOCUMENTS

| | | |
|---|---|---|
| CN | 101970119 | 2/2011 |
| EP | 0348620 | 1/1990 |

(Continued)

OTHER PUBLICATIONS

Abstract not available for EP2313200, Abstract of corresponding document WO2010007157 (1 page).
(Continued)

*Primary Examiner* — Chester Barry
(74) *Attorney, Agent, or Firm* — Ware, Fressola, Maguire & Barber LLP

(57) ABSTRACT

An apparatus for collecting mineral particles in a slurry or the tailings is disclosed, including a collection area or tank having one or more collection surfaces configured to contact with a mixture having water and valuable material, the valuable material having a plurality of mineral particles of interest; and a synthetic material provided at least on the one or more collection surfaces, the synthetic material having plurality of molecules with a siloxane functional group configured to attract the mineral particles of interest to the collection surfaces. The one or more collection surfaces includes a conveyor belt that is driven through the collection area or tank, through a release area or tank, back through the
(Continued)

collection area or tank. The mixture includes a pulp slurry having ground ore with mineral particles of interest forming part thereof, including mineral particles of interest of about 500 microns or larger.

29 Claims, 16 Drawing Sheets

Related U.S. Application Data

(60) Provisional application No. 61/822,679, filed on May 13, 2013.

(56) References Cited

U.S. PATENT DOCUMENTS

| | | | |
|---|---|---|---|
| 2,585,473 A | | 2/1952 | Kennedy |
| 2,699,872 A | | 1/1955 | Kelsey |
| 3,224,582 A | | 12/1965 | Iannicelli |
| 3,796,308 A | | 3/1974 | McIlhinney et al. |
| 3,931,907 A | | 1/1976 | Henle |
| 4,100,242 A | | 7/1978 | Leach |
| 4,126,275 A | * | 11/1978 | Timberlake ............ C01B 25/01 209/164 |
| 4,177,253 A | | 12/1979 | Davies et al. |
| RE30,360 E | | 8/1980 | Shubert |
| 4,235,562 A | | 11/1980 | Ribas |
| 4,236,995 A | | 12/1980 | Kruyer |
| 4,269,699 A | | 5/1981 | McCready et al. |
| 4,358,368 A | | 11/1982 | Hellsten et al. |
| 4,363,749 A | | 12/1982 | Weiss et al. |
| 4,412,843 A | | 11/1983 | Burgess et al. |
| 4,511,461 A | | 4/1985 | Kruyer |
| 4,532,032 A | * | 7/1985 | Ng ........................ B03D 1/008 209/166 |
| 4,556,482 A | | 12/1985 | Nagaraj |
| 4,657,666 A | | 4/1987 | Snook et al. |
| 4,685,963 A | | 8/1987 | Saville |
| 4,888,106 A | | 12/1989 | Lipp et al. |
| 4,906,382 A | | 3/1990 | Hwang |
| 4,971,685 A | | 11/1990 | Stanley et al. |
| 4,981,582 A | | 1/1991 | Yoon et al. |
| 5,161,694 A | | 11/1992 | Yoon et al. |
| 5,192,423 A | | 3/1993 | Duczmal et al. |
| 5,256,298 A | | 10/1993 | Powell |
| 5,603,841 A | | 2/1997 | Kerr |
| 5,670,056 A | | 9/1997 | Yoon et al. |
| 5,965,117 A | | 10/1999 | Howard, Jr. et al. |
| 6,234,318 B1 | | 5/2001 | Breau et al. |
| 6,312,603 B1 | | 11/2001 | Nishizawa |
| 6,319,407 B1 | | 11/2001 | Maatta et al. |
| 6,799,682 B1 | | 10/2004 | Yoon |
| 6,871,743 B2 | | 3/2005 | Yoon |
| 6,890,431 B1 | | 5/2005 | Eades et al. |
| 7,264,728 B2 | | 9/2007 | Gibson et al. |
| 7,641,863 B2 | | 1/2010 | Doktycz et al. |
| 7,891,213 B2 | | 2/2011 | Bogdahn et al. |
| 8,007,754 B2 | | 8/2011 | Yoon et al. |
| 8,408,395 B2 | | 4/2013 | Domke et al. |
| 2003/0104359 A1 | | 6/2003 | Cuthbertson et al. |
| 2003/0225231 A1 | | 12/2003 | Hall |
| 2004/0000523 A1 | | 1/2004 | Rosenberg et al. |
| 2004/0084380 A1 | * | 5/2004 | Kicinski ............... C02F 11/185 210/748.01 |
| 2004/0173506 A1 | | 9/2004 | Doktycz et al. |
| 2005/0029195 A1 | | 2/2005 | Gibson et al. |
| 2005/0029204 A1 | | 2/2005 | Schwartzkopf |
| 2005/0139551 A1 | | 6/2005 | Yoon |
| 2005/0155415 A1 | | 7/2005 | Kurowski et al. |
| 2006/0113259 A1 | | 6/2006 | Brunone |
| 2006/0226051 A1 | | 10/2006 | Navarrette et al. |
| 2006/0263516 A1 | | 11/2006 | Jones et al. |
| 2007/0034554 A1 | * | 2/2007 | Van Der Weijden ..... B03B 9/04 209/213 |
| 2009/0061226 A1 | | 3/2009 | Banin et al. |
| 2009/0173668 A1 | | 7/2009 | Duyvesteyn et al. |
| 2009/0176920 A1 | * | 7/2009 | Sandmeyer ............... C08J 3/03 524/413 |
| 2009/0206040 A1 | | 8/2009 | Berg et al. |
| 2009/0267275 A1 | | 10/2009 | Birken |
| 2009/0301972 A1 | | 12/2009 | Hines et al. |
| 2010/0059449 A1 | | 3/2010 | Grass et al. |
| 2010/0072110 A1 | | 3/2010 | Gradek |
| 2010/0098607 A1 | | 4/2010 | Davis et al. |
| 2010/0200510 A1 | * | 8/2010 | Domke ..................... B03C 1/01 210/679 |
| 2010/0279322 A1 | | 11/2010 | Tang et al. |
| 2010/0294725 A1 | | 11/2010 | Bush et al. |
| 2010/0300941 A1 | | 12/2010 | Domke et al. |
| 2011/0114566 A1 | | 5/2011 | McCaw et al. |
| 2011/0120919 A1 | | 5/2011 | Domke et al. |
| 2012/0029120 A1 | | 2/2012 | Soane et al. |
| 2012/0076694 A1 | | 3/2012 | Morozov et al. |
| 2012/0091000 A1 | | 4/2012 | Taylor et al. |
| 2014/0138324 A1 | * | 5/2014 | Rothman ............... B01D 15/02 210/748.02 |
| 2014/0339172 A1 | | 11/2014 | Rothman | |

FOREIGN PATENT DOCUMENTS

| | | | |
|---|---|---|---|
| EP | 1184064 | | 3/2002 |
| EP | 2313200 | | 4/2011 |
| KZ | 22494 | | 5/2010 |
| RU | 2091141 | | 9/1997 |
| RU | 2451049 | C2 * | 5/2012 |
| SU | 441314 | | 8/1974 |
| WO | 8404701 | | 12/1984 |
| WO | 02066168 | | 8/2002 |
| WO | 2004064997 | | 8/2004 |
| WO | 2005066631 | | 7/2005 |
| WO | 2010007157 | | 1/2010 |
| WO | 2012162597 | A1 | 11/2012 |
| WO | 2012162632 | | 11/2012 |
| WO | 2013112240 | A1 | 8/2013 |

OTHER PUBLICATIONS

CN101970119 English Language Abstract (1 page).
Wyss et al. "A novel approach for the extraction of herbicides and pesicides from water using liquid-core microcapsules" by Wyss et al. Biotechnology and Engineering; Aug. 19, 2004; abstract, 3 pages.
Krishna et al. "Synthesis of xanthate functionalized silica gel and its application for the preconcentration and separation of uranium (VI) from inorganic components." Journal of Radioanalytical and Nuclear Chemistry. vol. 266, No. 2 (2005) 251-257.
Brown et al. Magnetic Control over Liquid Surface Properties with Responsive Surfactants. Angew. Chem. Int. Ed. 51: 1-4, 2012 (retrieved on Apr. 6, 2013). Retrieved from the Internet. <URL: http://www.magneticmicrosphere.com/ckfinder/userfiles/files/ Brown_magnetic_detergent_2012.pdf>. entire document.
RU2091141 English Language Abstract (1 page).
SU441314 English Language translation (4 pages).
KZ22494 English Language Abstract (1 page). There are two Patentees of KZ22494—« (73) Товарищество с ограниченной ответственностью "Горнорудная компания"; »; Товарищество с ограниченной ответственностью "Институт высоких технологий». The Patentees are translated as: (73) limited liability company « Ore mining company» ; limited liability company « Institute of high technology» .
"The process of separation of fine mineral particles by flotation with hydrophobic polymeric carrier" by Jorge Rubio et al, International Journal of Mineral Processing, vol. 37, No. 1-2, Jan. 1, 1993, pp. 109-122.

\* cited by examiner

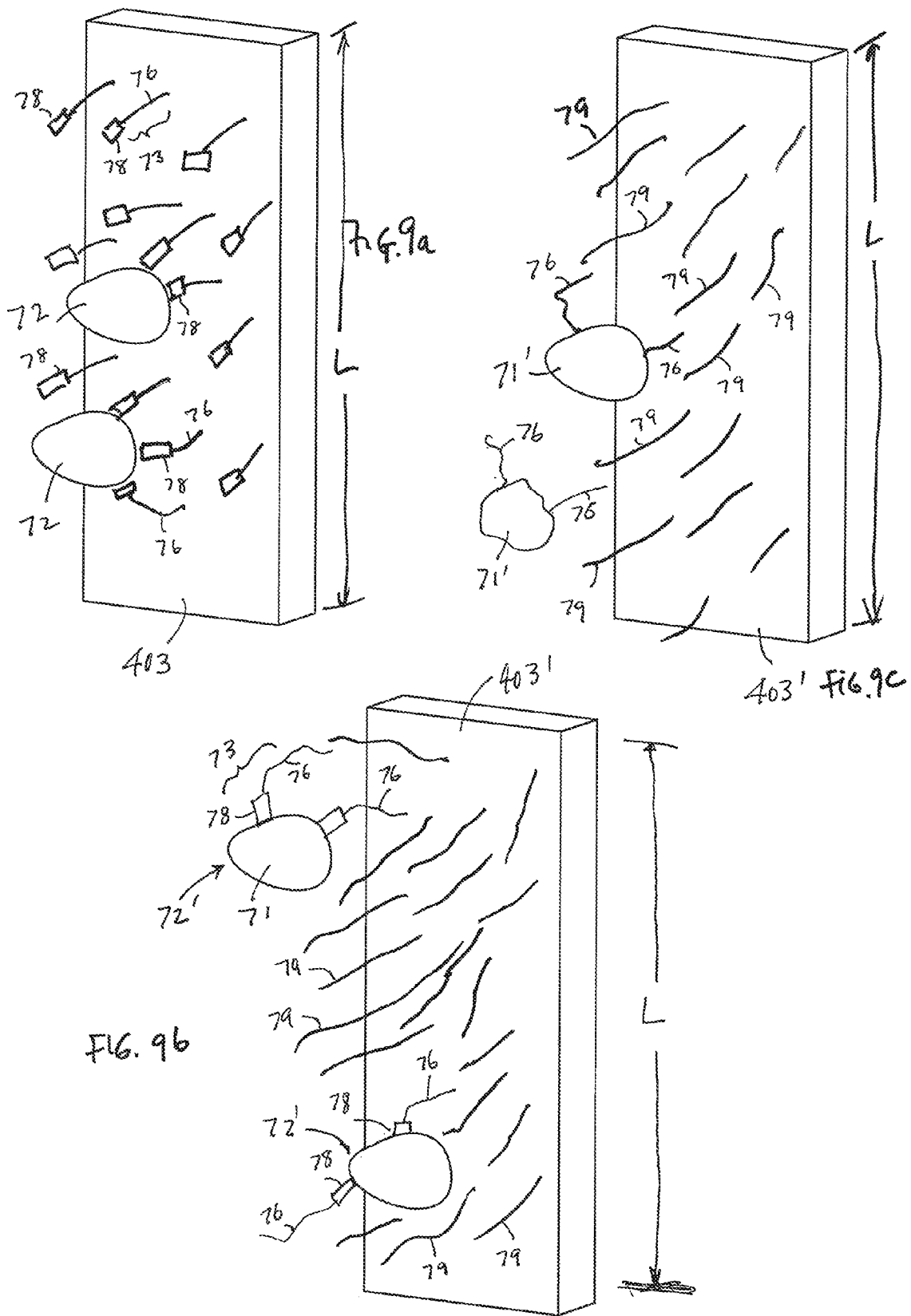

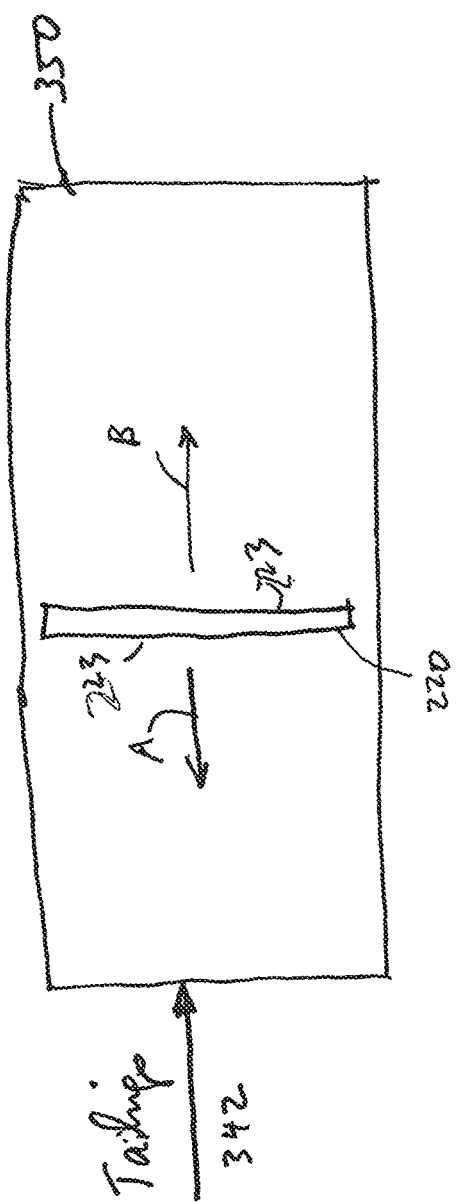

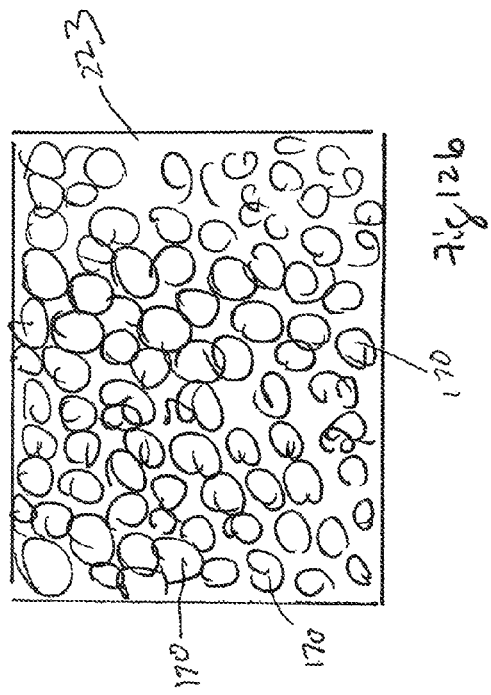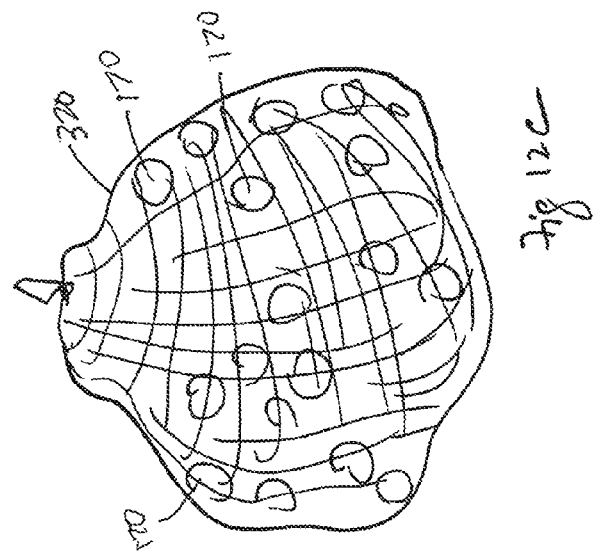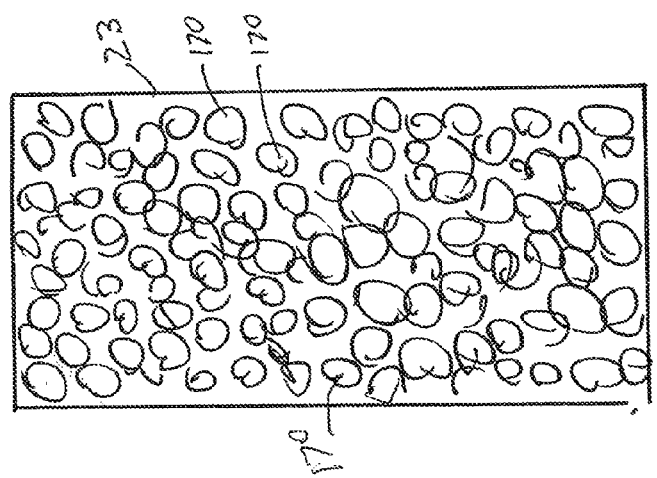

APPARATUS HAVING POLYMER SURFACES HAVING A SILOXANE FUNCTIONAL GROUP

CROSS-REFERENCE TO RELATED APPLICATION

This application corresponds to International Patent Application Number: PCT/US14/37823, filed 13 May 2014, which claims benefit to provisional patent application Ser. No. 61/822,679, filed 13 May 2013, which is hereby incorporated by reference in its entirety.

This application in a continuation in part of, and claims benefit to, U.S. patent application Ser. No. 14/118,984, filed 27 Jan. 2014, which corresponds to PCT application no. PCT/US12/39631, filed 25 May 2012, which itself claims benefit to U.S. Provisional Patent Application No. 61/489,893, filed 25 May 2011, and U.S. Provisional Patent Application No. 61/533,544, filed 12 Sep. 2011, all of which are hereby incorporated by reference in its entirety.

This application is also related to a family of nine PCT applications, which were all concurrently filed on 25 May 2012, as follows:

PCT application no. PCT/US12/39591, entitled "Method and system for releasing mineral from synthetic bubbles and beads;"

PCT application no. PCT/US12/39528, entitled "Flotation separation using lightweight synthetic bubbles and beads;"

PCT application no. PCT/US12/39524, entitled "Mineral separation using functionalized polymer membranes;"

PCT application no. PCT/US12/39540, entitled "Mineral separation using sized, weighted and magnetized beads;"

PCT application no. PCT/US12/39576, entitled "Synthetic bubbles/beads functionalized with molecules for attracting or attaching to mineral particles of interest;"

PCT application no. PCT/US/39596, entitled "Synthetic bubbles and beads having hydrophobic surface;"

PCT application no. PCT/US12/39655, entitled "Mineral recovery in tailings using functionalized polymers;" and PCT application no. PCT/US12/39658, entitled "Techniques for transporting synthetic beads or bubbles In a flotation cell or column,"

all of which are incorporated by reference in their entirety.

This application also related to PCT application no. PCT/US13/28303, filed 28 Feb. 2013, entitled "Method and system for flotation separation in a magnetically controllable and steerable foam," which is also hereby incorporated by reference in its entirety.

BACKGROUND OF THE INVENTION

1. Technical Field

This invention relates generally to a method and apparatus for separating valuable material from unwanted material in a mixture, such as a pulp slurry.

2. Background of the Invention

In many industrial processes, flotation is used to separate valuable or desired material from unwanted material. By way of example, in this process the pulp slurry is a mixture of water, valuable material, unwanted material, and chemicals to render the value material to be hydrophobic. The valuable material and unwanted material from an ore are usually ground to a particle size between 45 to 250 microns or roughly 45 to 100 mesh. When the separation takes place in a flotation cell where air bubbles are used to carry the material to the surface of the flotation cell, particles smaller than 400 mesh are usually required. Fine grinding consumes a great amount of electrical energy. In view of this, there is a need in the industry to provide a better way to separate valuable material from unwanted material, e.g., including in such a flotation cell, so as to eliminate problems associated with using air bubbles in such a separation process.

Moreover, By way of example, known techniques for mineral separation include the following:

Other known mineral separation techniques were apparently developed, e.g., to solve the disadvantages associated with the aforementioned flotation separation process, which are based on using magnetic particles, such as magnetite, which is one of the most magnetic of all the naturally occurring minerals on Earth.

As one example, U.S. Pat. No. 4,657,666 discloses a magnetic separation technique for mineral upgrading or concentration that includes steps of:

providing a gangue associated mineral having a hydrophobic surface and in particulate form;

providing a magnetic material in particulate form, silanizing the magnetic material in order to provide a hydrophobic surface;

contacting the gangue associated mineral with the magnetic material in an aqueous liquid, whereby the mineral particles become attached to the surface of the magnetic particles by virtue of interaction between the hydrophobic surfaces of the particles; and separating the magnetic particles with attached mineral particles from gangue by magnetic means, detaching the mineral particles from the magnetic particles.

The magnetic material may include magnetite, haematite, ilmenite, a ferrite or magnetic metal or alloy.

As a further example, U.S. Pat. No. 4,906,382 discloses a magnetic separation technique for separating particles of a nonmagnetic material from an aqueous mixture that includes steps of:

rendering surfaces of the particles magnetic by contacting with a magnetizing reagent having water containing particles of a magnetic material, each of the magnetic particles having a two layer surfactant coating including an inner layer and an outer layer, the inner layer covering the magnetic particle and being a monomolecular layer of a first water soluble, organic, heteropolar surfactant containing at least 3 carbon atoms and having a functional group on one end which forms a bond with the magnetic particle and a hydrophobic end, and the outer layer coating the inner layer and being monomolecular layer of a second water soluble, organic, heteropolar surfactant containing at least 3 carbon atoms and having a hydrophobic end which is bonded to the hydrophobic end of the first surfactant and a functional group on the other end capable of bonding with the nonmagnetic particles; and subjecting the aqueous mixture to a magnetic separation to cause the magnetized particles to be separated therefrom.

However, there are known disadvantages of the aforementioned magnetic separation techniques, e.g., that may include the need for high magnetic fields that are required in order to separate the magnetic particles from the original mixture; the need for complicated, costly equipment required for this purpose; and the need to ensure that the magnetic particle coupled to the ore remains stably attached during the flotation process and can be separated off again after the separation.

U.S. Pat. No. 8,408,395 discloses another known technique for mineral separation that apparently tried to solve the aforementioned disadvantages associated with the aforementioned magnetic separation techniques disclosed in the '666 patent and the '382 patent. For example, the '395 patent discloses a magnetic separation technique for separating a hydrophobic material from a mixture having a hydrophobic material and a hydrophilic material, that includes the steps of:

(A) preparing a slurry or dispersion of the mixture to be treated in a suitable dispersion medium;

(B) contacting the slurry or dispersion from step (A) with a solid, hydrophobic surface to bind the hydrophobic material to be separated from the slurry or the dispersion, the solid hydrophobic surface being an interior wall of a tube, a surface of a plate, a surface of a conveyor belt or an interior wall of a reactor;

(C) removing the solid, hydrophobic surface to which the one hydrophobic material is bound in step (B) from the slurry or dispersion having a hydrophilic material; and (D) separating the hydrophobic material from the solid, hydrophobic surface, where the hydrophobic material present in the mixture is hydrophobicized by a substance before carrying out step (B), and also where the substance is made up of a radical and an anchor group having 1 to 3 reactive groups which interact(s) with the hydrophobic material to be separated off.

According to the '395 patentee, the use of a hydrophobicizing substance increases efficiency of separation, citing an example provided in which a glass beaker is coated with hydrophobized magnetite so that a hydrophobic surface is present. In particular, in the example provided, the solid, hydrophobic surface is formed, e.g., as a coating or layer with hydrophobized magnetite (surface-coated with 1-dodecyltrichlorosilane, with 1 $nm^2$ of magnetite surface being laden with about 10-50 molecules of trichlorosilane; diameter of the magnetite particles=10 nm) so that an area of the walls of about 40 $cm^2$ is hydrophobicized. Moreover, the '395 patent discloses that hydrophobic coating or layer has no polar groups, and therefore has a water repellant character. In effect, the '395 patent appears to try to solve problems associated with the aforementioned high magnetic fields, e.g., by removing the magnetite into the coating or layer that forms the solid, hydrophobic surface. According to the '395 patent, its mineral separation technique avoids coupling of magnetizable particles to the hydrophobic constituents in the mixture to be separated off, as well as the use of a stream of air. In addition, it is noted the mineral separation technique of the '395 patent is based on the use of magnetite and its associate magnetic forces in order to bind the hydrophobic material to be separated from the slurry or the dispersion to the coating or layer that forms the solid, hydrophobic surface.

SUMMARY OF THE INVENTION

According to some embodiments of the present invention, the present invention may provide mineral separation or filtration techniques based at least partly on using apparatus featuring a collection area comprising collection surfaces configured to contact with a mixture having water and valuable material, the valuable material having a plurality of mineral particles; and a synthetic material provided at least on the collection surfaces, the synthetic material having a plurality of molecules comprising a siloxane functional group configured to attract the mineral particles to the collection surfaces.

According to some embodiments of the present invention, the collection surface may take the form of an impeller, a conveyor belt, a filter assembly, a flat plate, a membrane or membrane structure and a plurality of synthetic beads.

It has been observed that a conveyor belt made of polyurethane and coated with a silicone gel able to collect value material of a wide range of sizes, including the particles far larger than about 500 microns. A surface used to collect the value material from a pulp slurry is herein referred to as a collection surface.

According to some embodiments of the present invention, the collection surface is functionalized to be hydrophobic so as to provide a bonding between the collection surface and a mineral particle that is hydrophobic. In some embodiments, the collection surface comprises a surface made of a polymer and coated with a silicone gel to provide the siloxane functional group. The term "bonding" when used in relation to two hydrophobic articles, such as the surface of the polymer bubbles or beads and the mineral particle, is intended to refer to the situation of when two hydrophobic articles come together in an aqueous solution to reduce the exposed hydrophobic surface area. This new state is at a lower energy state than when the two articles are separated within the aqueous solution. The action of the hydrophobic effect originates from the disruption of highly dynamic hydrogen bonds between molecules of liquid water for example by the non-polar solute. A hydrocarbon chain or a similar non-polar region or a big molecule is incapable of forming hydrogen bonds with water, and introduction of such a non-hydrogen bonding surface into water causes disruption of the hydrogen bonding network between water molecules. The hydrogen bonds are reoriented tangential to such a surface to minimize disruption of the hydrogen bonded 3D network of water molecules, thus leading to a structured water "cage" around the non-polar surface. Additionally, as used herein, the hydrophobic effect can be said to cause two hydrophobic articles to "attract" and/or "attach" to one another. The term "polymer" in this specification means a large molecule made of many units of the same or similar structure linked together. Therefore, the terms "polymer bubbles or beads" and "synthetic bubbles or beads" are used interchangeably. The polymer can be naturally hydrophobic or functionalized to be hydrophobic. Some polymers having a long hydrocarbon chain or silicon-oxygen backbone, for example, tend to be hydrophobic. Hydrophobic polymers include, but are not limited to, poly(dimethylsiloxane). The collection surfaces can be rendered hydrophobic by having a coating of a product that contains chemicals with a siloxane functional group. For example, the collection surface is coated with hydrophobic silicone polymer including polysiloxane so that the collection surface becomes hydrophobic. In one embodiment of the present invention, the collection surface is made of polyurethane rubber coated with a silicone gel, such as Dow-Corning® 3-4222 Dielectric Firm Gel. The gel comes with two parts: Part A includes dimethyl siloxane, dimethylvinyl-terminated—68083-19-2; polydimethylsiloxane (PDMS)—63148-62-9; reaction of ethylene glycol and silica—170424-65-4; hydrotreated light naphthenic petroleum distillate—64742-53-6. Part B includes dimethyl siloxane, dimethylvinyl-terminated—68083-19-2; polydimethylsiloxane—63148-62-9; dimethyl siloxane, hydrogen-terminated—none; trimethylated silica—68909-20-6; dimethyl, methylhydrogen siloxane—68037-59-2. The mineral particle or the valuable material associated with one or more amphiphilic collector molecules is referred to as a wetted mineral particle. When the pulp slurry contains a plurality of collectors or collector molecules, some of the mineral particles will become wetted mineral particles if the collectors are attached to mineral particles, thus making the surface of the mineral particles hydrophobic. Xanthates can be used in the pulp slurry as the collectors.

In effect, the key mechanism for the materials is the combination of hydrophobicity, tackiness and compliance. By way of example, according to some embodiments of the present invention, the mechanism works as follows:

1. The hydrophobicity of the surface provides the selectivity. When in the water based solution, the hydrophobic surface attracts the hydrophobic minerals of interest, and rejects the non-hydrophobic gangue materials.

2. As the hydrophobic material is removed from the solution, the tackiness of the material maintains the contact and "grip" on the collected hydrophobic minerals (which would otherwise fall off because there is no hydrophobic action to hold them in place after withdrawal from the solution).

3. Compliance is also a key component. Material compliance is essential to allow surface area contact in hydrophobic conditions, and further to allows surface area contact under tacky conditions after withdrawal from the solution. This may also be due at least in part to Van der Waals forces.

4. Another important feature is durability, with the understanding that there may be a tradeoff between durability and compliance and/or tackiness. One typically may want durability if one intends to reuse the materials (to make the process cost effective), but if one make the material too durable, one may lose either the compliance and/or tackiness feature of the material, thus the trade-off.

The Apparatus

According to some embodiments, the present invention may take the form of apparatus such as a collection surface configured to contact with solid hydrophobic particles having mineral particles with hydrophobic elements attached thereon contained in an aqueous mixture. The collection surface comprises a plurality of molecules configured to render the surface hydrophobic, and the molecules comprising a siloxane functional group to attract the solid hydrophobic particles.

According to some embodiments of the present invention, the molecules may include a siloxane derivative, or polysiloxanes, or hydroxyl-terminated polydimethylsiloxanes (PDMS).

According to some embodiments of the present invention, the collection surface may include an impeller, a flat plate, a filter assembly, a conveyor belt, a membrane and/or a synthetic bead having a polymer surface coated with a siloxane derivative. The polymer surface may comprise urethane, polyurethane molecules, such as urethane rubber or polyurethane rubber.

According to some embodiments of the present invention, the polymer is selected from a group consisting of polystyrene, poly(d,l-lactide), poly(dimethylsiloxane), polypropylene, polyacrylic, polyethylene, hydrophobically-modified ethyl hydroxyethyl cellulose polysiloxanes, alkylsilane and fluoroalkylsilane. The list, however, is not necessarily exhaustive.

According to some embodiments of the present invention, the synthetic bead may be configured to be magnetic, or para-, ferri- or ferro-magnetic.

According to some embodiments of the present invention, the synthetic bead may be configured to have a different density than the aqueous mixture so as to float or sink therein.

According to some embodiments of the present invention, the synthetic bead may be configured to have substantially the same density as the aqueous mixture so as to neither float nor sink therein.

According to some embodiments of the present invention, the surface may include physical structures configured to trap the mineral particles, e.g., like grooves or dents, or configured as hair-like structures.

According to some embodiments of the present invention, an impeller is configured to rotate inside two chambers, tanks, cells or columns, one chamber, tank, cell or column having an environment conducive to attachment of a valuable material or mineral or particle of interest and the other chamber, tank, cell or column has an environment conducive for release of the valuable material or mineral or particle of interest. The impeller may comprise a collection surface having a siloxane functional group, configured to rotate inside the two chambers, tanks, cells or columns for attachment of and for releasing of the valuable material.

According to some embodiments of the present invention, a functionalized polymer conveyor belt may be configured to run between the two chambers, tanks, cells or columns, whereby it collects and releases the valuable material or mineral or particle of interest.

According to some embodiments of the present invention, a functionalized polymer collection filter may be placed into each chamber, tank, cell or column to collect and release the valuable material or mineral or particle of interest. This is a batch type process.

The Method

According to some embodiments, the present invention, the method may feature steps for receiving an aqueous mixture in a processor, the mixture comprising solid hydrophobic particles having mineral particles with hydrophobic elements attached thereon; causing a plurality of collection surfaces to contact with the aqueous mixture in the processor, where said collection surface comprises:

a solid-phase body comprising a surface; and a coating of hydrophobic material, provided on the surface, the hydrophobic coating comprising a plurality of molecules configured to render the surface hydrophobic, the molecules comprising a siloxane functional group configured to attract to the surface the solid hydrophobic particles in the aqueous mixture.

According to some embodiments of the present invention, the solid-phase body may take the form of an impeller, a conveyor belt, a filter assembly with a plurality of collection surfaces, a synthetic bead, wherein the collection surface may comprise a polymer layer coated with a silicone gel to provide the siloxane functional group.

According to some embodiment of the present invention, the collection surface comprise polymer surface and the synthetic material comprise a siloxane derivative.

The synthetic material may comprise polysiloxanes.

The synthetic material may comprise one or more of dimethyl siloxane, dimethylvinyl-terminated; polydimethylsiloxane (PDMS); and dimethyl, methylhydrogen siloxane.

The synthetic material may comprise hydroxyl-terminated polydimethylsiloxanes.

According to one embodiment of the present invention, the polymer surface comprises polyurethane.

According to some embodiments of the present invention, the collection surface may comprise a polymer selected from a group consisting of polyamides, polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, and polydimethylsiloxane.

According to some embodiments of the present invention, the collection surface may comprise a polymer from a group consisting of polystyrene, poly(d,l-lactide), poly(dimethylsiloxane), polypropylene, polyacrylic, polyethylene, hydrophobically-modified ethyl hydroxyethyl cellulose polysiloxanes, alkylsilane and fluoroalkylsilane.

According to some embodiments of the present invention, the collection area comprises one or more of an impeller, a filter assembly, a conveyor belt and a flat plate.

According to some embodiments of the present invention, the collection area comprises a plurality of synthetic beads.

According to some embodiments of the present invention, the method may include one or more of the features set forth herein.

According to some embodiments of the present invention, the method may feature steps for arranging a plurality of collection surfaces to contact with an aqueous mixture comprising solid hydrophobic particles having mineral particles with hydrophobic elements attached thereon, said collection surface comprising: a solid-phase body comprising a synthetic surface, and a coating of a silicone gel comprising a plurality of molecules configured to render the surface hydrophobic, the molecules also being configured to attract the solid hydrophobic particles to the collection surface; allowing the solid hydrophobic particles to attach to the collection surfaces for providing a plurality of enriched collection surfaces, the enriched collection surfaces comprising at least some of the solid hydrophobic particles attached thereto; and releasing said some of the solid hydrophobic particles from the surface of the enriched collection surfaces.

According to some embodiments of the present invention, the method may include a step of releasing that includes washing the enriched collection surfaces with water so as to remove at least some of the solid hydrophobic particles from the surface. As the enriched collection surfaces are in the water, ultrasonic waves can also be applied to the enriched collection surfaces for removing the solid hydrophobic particles from surface.

According to some embodiments of the present invention, the method may include removing the enriched collection surfaces from the aqueous mixture by one or more of the following mechanisms: mechanical brushing, magnetic agitation, change of pH, increased temperature, and chemical solvent.

According to some embodiments of the present invention, the method may include one or more of the features set forth herein.

A Hydrophobic Synthetic Structure

According to some embodiments of the present invention, the apparatus may take the form of a hydrophobic synthetic structure having a solid-phase body comprising a surface; and a synthetic material provided on the surface, the synthetic material comprises a plurality of molecules configured to render the surface hydrophobic, and the combination of the molecules and the surface being configured to attract and retain solid hydrophobic particles having mineral particles with hydrophobic elements attached thereon contained in an aqueous mixture, the molecules comprising a siloxane functional group.

According to some embodiments of the present invention, the synthetic material may be selected from the following group: a siloxane derivative, polysiloxanes or hydroxyl-terminated polydimethylsiloxanes.

According to some embodiments of the present invention, the hydrophobic synthetic structure may take the form of some combination of a mesh-like structure, a membrane-like structure, a grooved structure, a grate-like structure, a tubular structure, a hairy structure, a course structure, a smooth structure, a rectangular structure, a honeycomb-like structure, a solid bead, or a two-part bead structure with an inner core and an outer covering, and the surface having a corresponding structural characteristic based at least partly on the configuration of the corresponding structure.

The Separation Process

The present invention may also take the form of apparatus for use in, or forming part of, a separation process to be implemented in separation processor technology, the apparatus featuring collection surfaces configured with a polymer or polymer-based material functionalized with a siloxane functional group so as to attach to a wetted valuable material in a mixture to form an enriched collection surfaces having the valuable material attached thereto, and also configured to be separated from the mixture based at least partly on a difference in a physical property between the enriched collection surfaces having the valuable material attached thereto and the mixture.

The separation process may be implemented in separation processor technology which combines the collection surfaces and the mixture, and which provides the enriched collection surfaces having the valuable material attached thereto that are separated from the mixture based at least partly on the difference in the physical property between the enriched collection surfaces having the valuable material attached thereto and the mixture.

According to some embodiments of the present invention, the collection surface carrying the mineral particles may be caused to contact with a liquid, and the step of interrupting may include applying a sonic agitation to the liquid for causing the mineral particles to separate from the collection surface, or the step of interrupting may include applying microwaves to the liquid for causing the mineral particles to separate from the collection surface. The step for interrupting may include providing an ultrasonic source to apply the sonic agitation to the liquid, and/or arranging the ultrasonic source to produce ultrasound signals for sonic agitation, for example ultrasound signals in the range of 20 KHz to 300 HKz for the sonic agitation. The step of interrupting may include providing an ultrasonic signal selected at the resonant frequency of the beads for causing the mineral particles to separate from the collection surface. The step of interrupting may include mechanically rubbing against the collection surface using one or more brushes to separate mineral particles from the collection surface. The brushing can be carried out in a solution containing a chemical solvent, such as alcohol, for example.

According to some embodiments of the present invention, the collection surface carrying the mineral particles may be received along with a mixture having a first pH value, and the step for interrupting may include causing the collection surface carrying the mineral particles to contact with a medium having a second pH value lower than the first pH value, including where the second pH value ranges from 0 to 7.

According to some embodiments of the present invention, the step of interrupting may include mechanically causing the collection surfaces, such as synthetic beads, to move against each other, including arranging a rotational means or device to stir the synthetic beads.

According to some embodiments of the present invention, the collection surface may be made of a polymer having a glass transition temperature, and the second temperature may be substantially equal to or higher than the glass transition temperature.

According to some embodiments of the present invention, part of the collection surfaces, such as synthetic beads, carrying the mineral particles may be made of a magnetic material, and the step of interrupting may include arranging a magnetic stirrer to stir the synthetic beads.

According to some embodiments of the present invention, the collection surface carrying the mineral particles may be received along with a mixture, wherein said interrupting comprises selecting two or more of the following interrupting techniques: 1) lowering pH value of the mixture, 2) applying an ultrasound to the mixture; 3) increasing temperature of the mixture, 4) mechanically brushing and 5) introduction of a chemical solvent. The selected interrupting techniques may be used on the mixture concurrently or sequentially.

BRIEF DESCRIPTION OF THE DRAWING

Referring now to the drawing, which are not necessarily drawn to scale, the foregoing and other features and advantages of the present invention will be more fully understood from the following detailed description of illustrative embodiments, taken in conjunction with the accompanying drawing in which like elements are numbered alike:

FIG. 1 includes

FIG. 9a illustrates a plurality of functional groups attached to surfaces for attracting mineral particles, according to some embodiments of the present invention.

FIG. 9b illustrates a plurality of hydrophobic molecules attached to surfaces for attracting mineral particles, according to some embodiments of the present invention.

FIG. 9c illustrates a plurality of hydrophobic molecules attached to surfaces for attracting non-mineral particles, according to some embodiments of the present invention.

FIG. 11 is a diagram showing a filter placed in a tailings pond to collect valuable material according to some embodiments of the present invention.

FIG. 12a illustrates an impeller using a plurality of synthetic beads or bubbles for collecting valuable material, according to some embodiments of the present invention.

FIG. 12b illustrates a filter using a plurality of synthetic beads or bubbles for collecting valuable material, according to some embodiments of the present invention.

FIG. 12c illustrates a sack of synthetic beads which can be used as a filter to collect valuable material in a tailings pond, for example, according to some embodiments of the present invention.

DETAILED DESCRIPTION OF THE INVENTION

Figure 15A:
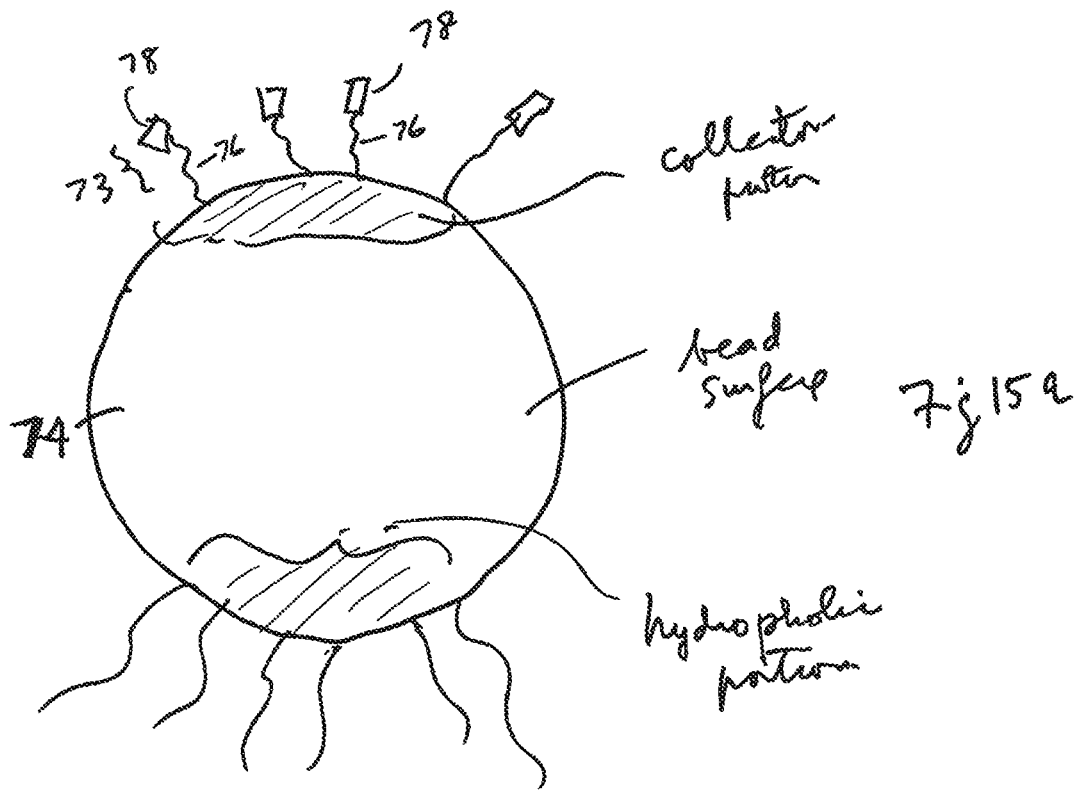
FIGS. 15a and 15b illustrate some embodiments of the present invention wherein the synthetic bead or bubble have one portion functionalized to have collector molecules and another portion functionalized to be hydrophobic, according to some embodiments of the present invention.
Figure 15B:
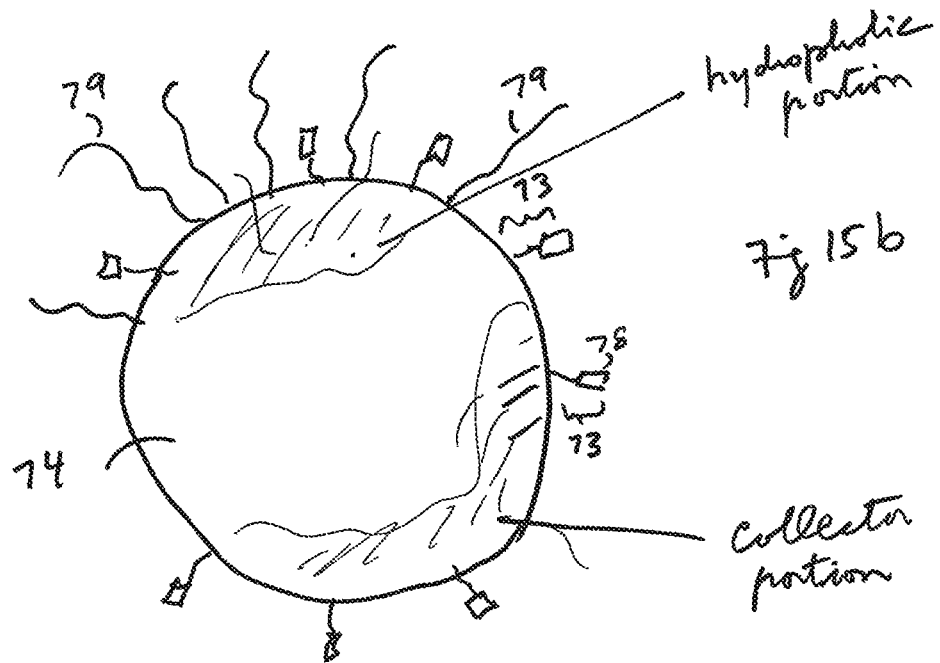
Figure 16A:
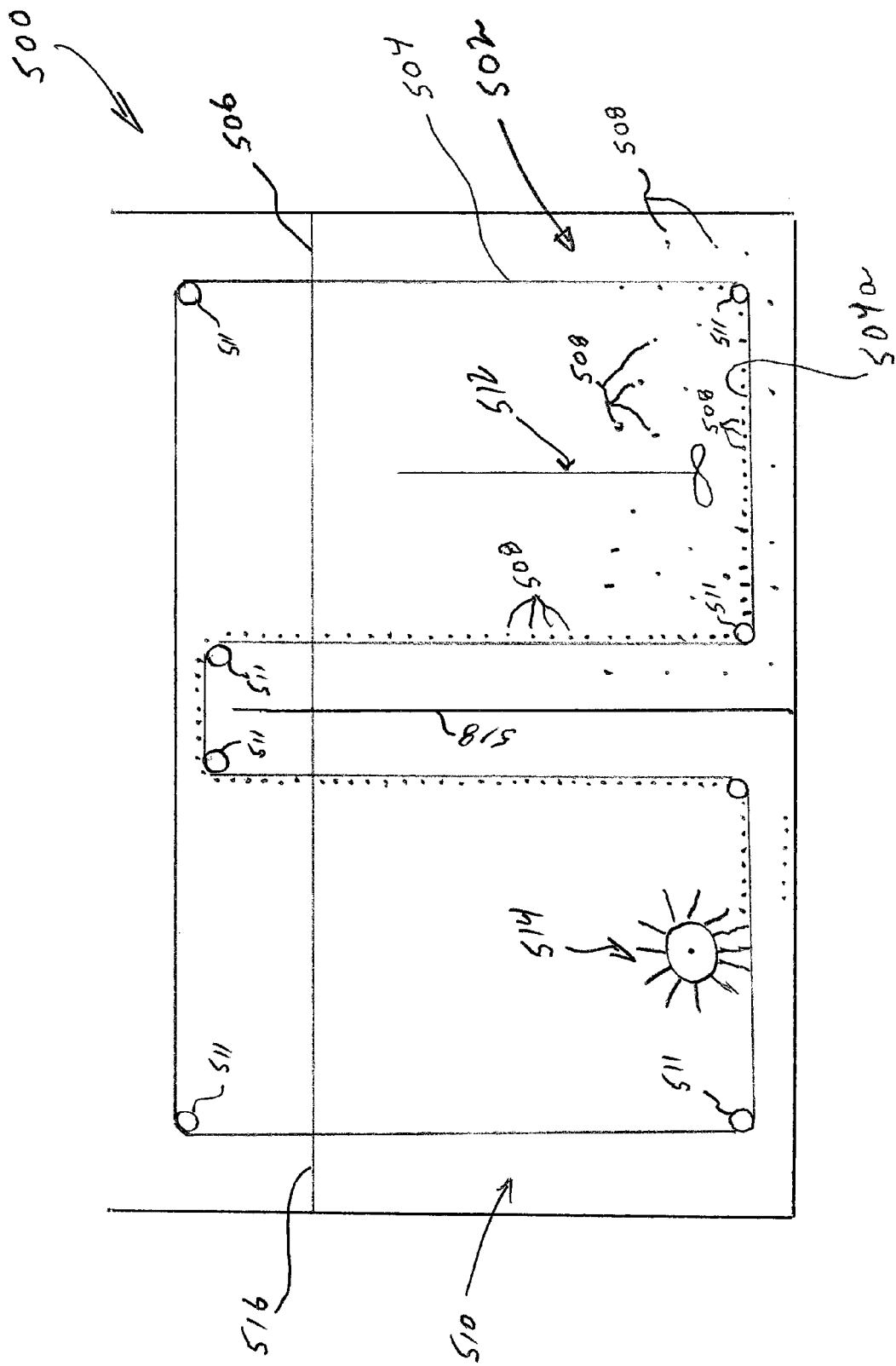
FIG. 16a shows a diagram of apparatus having a conveyor belt made of polyurethane and coated with a silicone gel for collecting value material of a wide range of sizes, including the particles far larger than about 500 microns, according to some embodiments of the present invention.
Figure 16B:
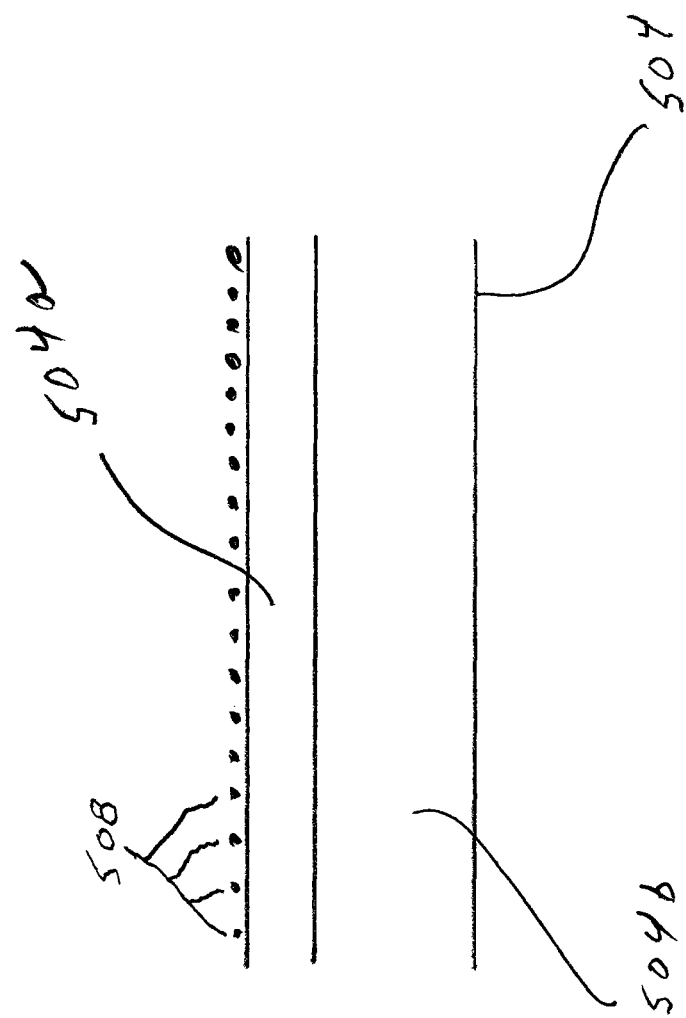
FIG. 16b shows an exploded or enlarged diagram of a part of the conveyor belt shown in FIG. 16a, according to some embodiments of the present invention.

FIGS. 16a and 16b shows a new embodiment of the present invention, while the remaining FIGS. 1 to 15b show the subject matter of the aforementioned PCT application no. PCT/US12/39631 (712-2.385/CCS-0092).

FIGS. 16a, 16b

FIG. 16a shows the present invention in the form of an apparatus generally indicated as 500 including a collection area or tank 502 having one or more collection surfaces 504 configured to contact with a mixture 506 having water and valuable material, the valuable material having a plurality of mineral particles 508 of interest; and a synthetic material 504a provided at least on the collection surfaces as shown in FIG. 16b, the synthetic material 504a having plurality of molecules with a siloxane functional group configured to attract the mineral particles 508 of interest to the collection surfaces 504.

In FIG. 16, the one or more collection surfaces 504 may form part of a conveyor belt also indicated as 504, as shown, that is driven through the collection area or tank 502, through a release area or tank 510, back through the collection area or tank 502, etc. As shown, the conveyor belt 504 is arranged on various pulleys 511 that may be driven by one or more motors (not shown) and configured with corresponding linkage (also not shown). Conveyor belts and conveyor belt systems are known in the art, and the scope of the invention is not intended to be limited to any particular type or kind thereof either now known or later developed in the future.

According to some embodiments of the present invention, the mixture 506 may include, or take the form of, a pulp slurry having ground ore with mineral particles of interest forming part thereof, including mineral particles of interest of about 500 microns or larger. According to some embodiments of the present invention, the mixture 506 may include chemistry configured to enhance the attraction and/or attachment between the synthetic material having the siloxane functional group and the mineral particles 508 of interest in the mixture 506. By way of example, the mixture 506 may include a hydrophobizing agent and/or polymeric collector, e.g., including polyethylenimine (PEI), although the scope of the invention is intended to include other types or kinds of hydrophobizing agents and/or polymeric collectors within the spirit of the present invention. By way of further example, embodiments are envisioned in which the mixture 506 may include Xanthate or Xanthate salt, which is otherwise known in the art to be used as a flotation and/or hydrophobic agent in mineral processing. The chemistry set forth herein is intended to include chemistry or chemistries that are both now known or later developed in the future.

According to some embodiments of the present invention, the collection area or tank 502 may be configured with one or more stirrers, mixers or agitators 512 for stirring, mixing or agitating the mixture 506. The release area or tank 510 may be configured with one or more broom-like devices 514 for sweeping and/or releasing in whole or in part attached mineral particles 508 of interest from the synthetic material 504a of the collection surfaces 504. Embodiments are envisioned in which the broom-like device 514 is configured on either or both sides of the conveyor belt 504. According to some embodiments of the present invention, the release area or tank 510 may have a corresponding mixture 516 configured to enhance the releasing in whole or in part of the attached mineral particles 508 of interest from the synthetic material 504a of the collection surfaces 504. As shown, the collection area or tank 502 and the release area or tank 510 are separated by a wall 518.

By way of example, the conveyor belt 504 may be made of polyurethane rubber indicated as 504b in FIG. 16b and coated with a silicone gel indicated as 504a for collecting the valuable material of interest of a wide range of sizes, including particles far larger than about 500 microns. After being coated on the polyurethane rubber 504b, the silicone gel 504a will cure and harden to as to form part of, and stick to, the polyurethane rubber 504b. Embodiments are envisioned in which the polyurethane rubber 504b may be coated on either or both sides with the silicone gel 504a. The scope of the invention is intended to include, and embodiments are envisioned in which, the conveyor belt 504 may be made of some other elastic material either now known or later developed in the future. The silicone gel 504a may include, or take the form of, molecules having the siloxane functional group, including a siloxane that is, or may take the form of, a functional group in organosilicon chemistry with the Si—O—Si linkage. By way of example, parent siloxanes may include, or take the form of, oligomeric and polymeric hydrides with the formulae $H(OSiH_2)_nOH$ and $(OSiH_2)_n$. The scope of the invention is also intended to include other types or kinds of siloxanes either now known or later developed in the future, e.g., including branched compounds, where the defining feature includes each pair of silicon centers being separated by one oxygen atom. In one embodiment of the present invention, and set forth by way of example, the silicone gel 504a took the form of a product from Dow-Corning® Corporation, Midland, Mich. 48686-0994, USA, e.g., labeled as product no. 2986922-1104 (Lot: 0007137499), that is sold in a combination that includes 3-4222 Dielectric Firm Gel Part A and 3-4222 Dielectric Firm Gel Part B. The gel comes with two parts: Part A includes dimethyl siloxane, dimethylvinyl-terminated—68083-19-2; polydimethylsiloxane—63148-62-9; reaction of ethylene glycol and silica—170424-65-4; hydrotreated light naphthenic petroleum distillate—64742-53-6. Part B includes dimethyl siloxane, dimethylvinyl-terminated—68083-19-2; polydimethylsiloxane—63148-62-9; dimethyl siloxane, hydrogen-terminated—none; trimethylated silica—68909-20-6; dimethyl, methylhydrogen siloxane—68037-59-2. The scope of the invention is intended to include, and embodiments are envisioned in which, the one or more collection surfaces 504 may be configured or made substantially of a material that consists of a siloxane-based material in a non-gel form.

PDMS

By way of example, PDMS is understood to be characterized by a chemical formula:

$$CH_3[Si(CH_3)_2O]_nSi(CH_3)_3,$$

where n is the number of repeating monomer $[SiO(CH_3)_2]$ units.

PDMS includes oxygen, hydrogen, silicon and carbon. Because of the presence of oxygen, PDMS is normally considered or classified as being part of a polar group. In chemistry, polarity is generally understood to refer to a separation of electric charge leading to a molecule or its chemical groups having an electric dipole or multipole moment, and a polar molecule is generally understood to have a polarity that is characterized as being asymmetric.

Alternatives to Conveyor Belt Embodiments

The scope of the invention is not intended to be limited to the collection surface 504 including, or taking the form of, a conveyor belt. For example, embodiments are envisioned in which the collection surface 504 includes, or takes the form of, one or more of an impeller, a filter assembly and/or a flat plate, as well as other types or kinds of collection surfaces either now known or later developed in the future, consistent with that set forth herein.

FIGS. 1 to 15b

Figure 1B:
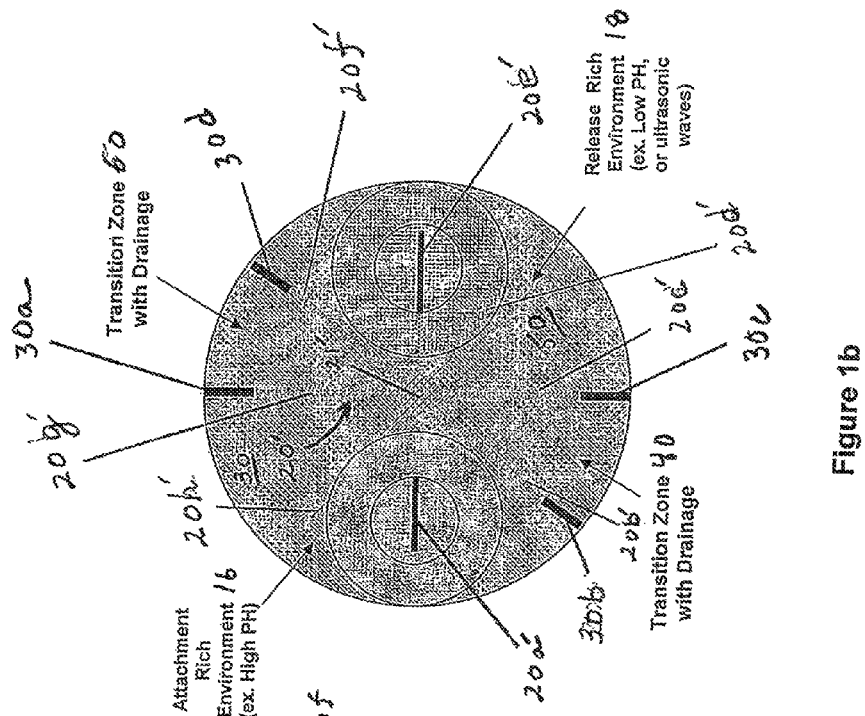
FIG. 1b is a top partial cross-sectional view in diagram form of a functionalized polymer coated impeller moving in an attachment rich environment contained in an attachment chamber, tank or column and also moving in a release rich environment contained in a release chamber, tank or column according to some embodiments of the present invention.
Figure 1A:
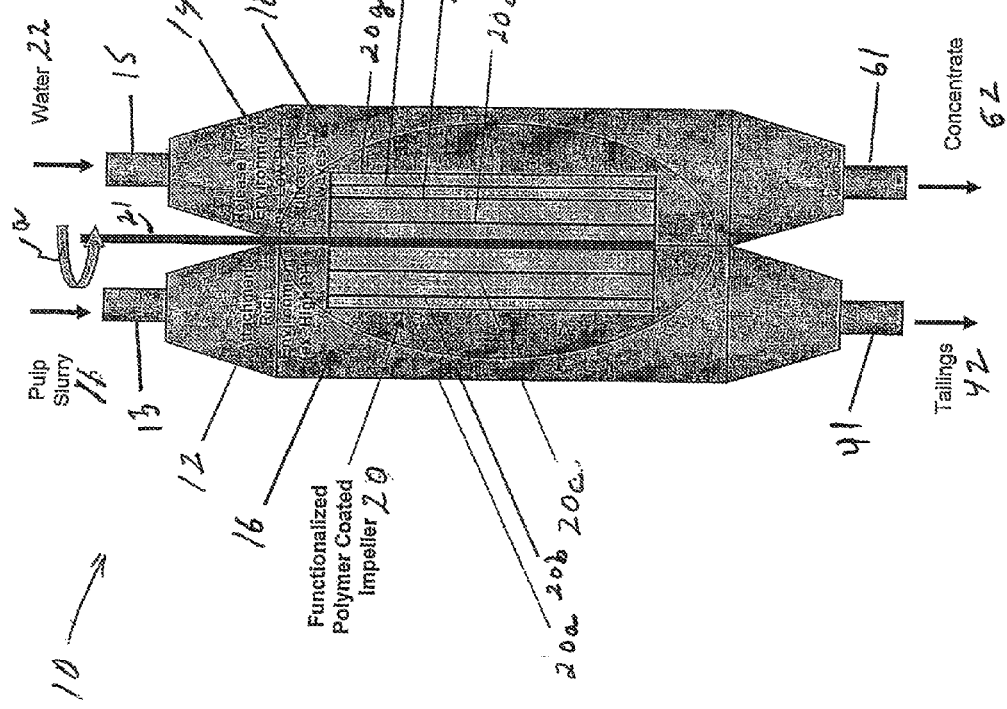
FIG. 1a is a side partial cutaway view in diagram form of a separation processor configured with two chambers, tanks or columns having a functionalized polymer coated impeller arranged therein according to some embodiments of the present invention, and includes

The remaining part of the application describes the subject matter of FIGS. 1 to 15b of the aforementioned PCT application no. PCT/US12/39631 (712-2.385/CCS-0092), as follows:

FIGS. 1, 1a, 1b

By way of example, FIG. 1 shows the present invention is the form of a machine, device, system or apparatus 10, e.g., for separating valuable material from unwanted material in a mixture 11, such as a pulp slurry, using a first processor 12 and a second processor 14. The first processor 12 and the second processor 14 are configured with a functionalized polymer coated member that is shown, e.g., as a functionalized polymer coated impeller 20 (FIG. 1a), 20' (FIG. 1b), according to some embodiments of the present invention. In operation, the impeller 20, 20' slowly rotates in relation to the first processor 12 and the second processor 14, the impeller blades slowly pass through the attachment rich environment 16 in the first processor 12 where the valuable material is attached to the blades and through the release rich environment 18 in the second processor 14. is released from the blades. By way of example, the impeller 20 is shown rotating in a counterclockwise direction as indicated by arrow a, although the scope of the invention is not intended to be limited to the direction of the impeller rotation, or the manner in which the functionalized polymer coated impeller 20 (FIG. 1a), 20' (FIG. 1b) is arranged, mounted, or configured in relation to the first processor 12 and the second processor 14.

The first processor 12 may take the form of a first chamber, tank, cell or column that contains an attachment rich environment generally indicated as 16. The first chamber, tank or column 12 may be configured to receive via piping 13 the mixture or pulp slurry 11 in the form of fluid (e.g., water), the valuable material and the unwanted material in the attachment rich environment 16, e.g., which has a high pH, conducive to attachment of the valuable material. The second processor 14 may take the form of a second chamber, tank, cell or column that contains a release rich environment generally indicated as 18. The second chamber, tank, cell or column 14 may be configured to receive via piping 15, e.g., water 22 in the release rich environment 18, e.g., which may have a low pH or receive ultrasonic waves conducive to release of the valuable material. Attachment rich environments like that forming part of element environment 16 conducive to the attachment of a valuable material of interest and release rich environments like that forming part of environment 18 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 16 and a corresponding release rich environment like environment 18 based on the separation technology disclosed herein for any particular valuable mineral of interest, e.g., copper, forming part of any particular mixture or slurry pulp.

In operation, the first processor 12 may be configured to receive the mixture or pulp slurry 11 of water, valuable material and unwanted material and the functionalized polymer coated member that is configured to attach to the valuable material in the attachment rich environment 16. In FIG. 1, the functionalized polymer coated member is shown as the functionalized polymer coated impeller 20 (FIG. 1a), 20' (FIG. 1b). In FIG. 1a, the functionalized polymer coated impeller 20 has a shaft 21 and at least one impeller blade 20a, 20b, 20c, 20d, 2e, 20f, 20g and is configured to rotate slowly inside the first processor 12 and the second processor 14. In FIG. 1b, the functionalized polymer coated impeller 20' has a shaft 21' and impeller blades 20a', 20b', 20c', 20d', 2e', 20f', 20g' and 20h'. Each impeller blade in FIG. 1 is understood to be configured and functionalized with a polymer coating to attach to the valuable material in the attachment rich environment 16. (The scope of the invention is not intended to be limited to the number of blades on the impeller 20, 20' and the embodiment in FIGS. 1a and 1b is shown with impellers 21, 21' having a different number of blades.)

In FIG. 1, the first processor 12 is configured to receive at least one impeller blade of the functionalized polymer coated impeller 20 (FIG. 1a), 20' (FIG. 1b). In FIG. 1b, the at least one impeller blade is shown as impeller blade 20g' being received in an attachment zone 30 that forms part of the attachment rich environment 16 defined by walls 30a, 30b. The first processor 12 may also be configured with a first transition zone generally indicated as 40 to provide drainage from piping 41 of, e.g., tailings 42 as shown in FIG. 1a.

The first processor 12 may also be configured to provide at least one enriched impeller blade having the valuable material attached thereto, after passing through the attachment rich environment 16. In FIG. 1b, the at least one enriched impeller blade is shown as the at least one enriched impeller blade 20c' being provisioned from the attachment rich environment 16 in the first processor 12 to the release rich environment 18 in the second processor 14.

The second processor 14 may be configured to receive via the piping 15 the fluid 22 (e.g. water) and the enriched functionalized polymer coated member to release the valuable material in the release rich environment 18. In FIG. 1b, the second processor 14 is shown receiving the enriched impeller blade 20c' in a release zone 50, e.g., that forms part of the release rich environment 18 and is defined, e.g., by walls 30c and 30d.

The second processor 14 may also be configured to provide the valuable material that is released from the enriched functionalized polymer coated member into the release rich environment 18. For example, in FIG. 1b the second processor 14 is shown configured with a second transition zone 60 defined by walls 30a and 30d to provide via piping 61 drainage of the valuable material in the form of a concentrate 62 (FIG. 1a).

Figure 2:
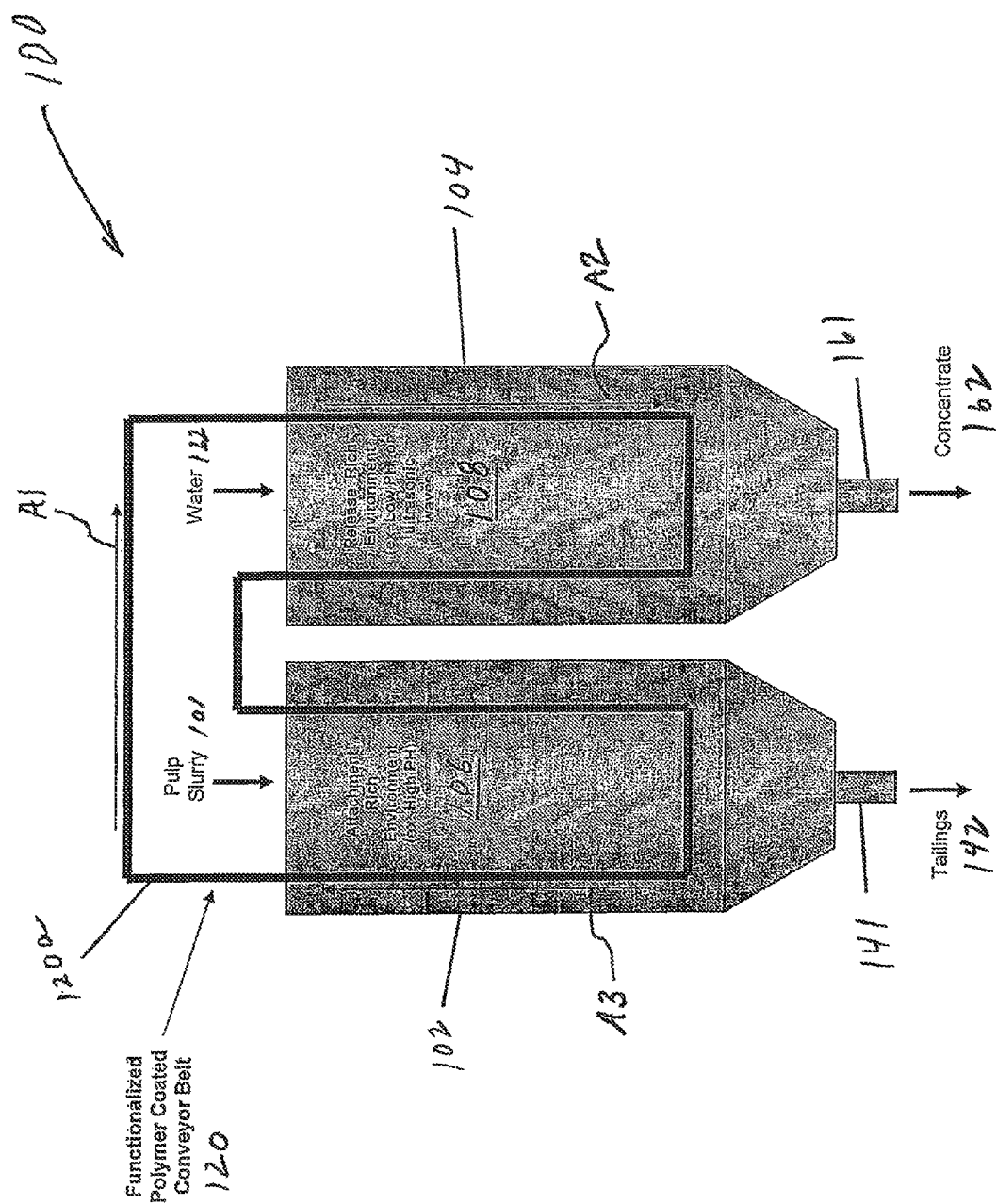
FIG. 2 is diagram of a separation processor configured with two chambers, tanks or columns having a functionalized polymer coated conveyor belt arranged therein according to some embodiments of the present invention.

FIG. 2: The Functionalized Polymer Coated Conveyor Belt

By way of example, FIG. 2 shows the present invention is the form of a machine, device, system or apparatus 100, e.g., for separating valuable material from unwanted material in a mixture 101, such as a pulp slurry, using a first processor 102 and a second processor 104. The first processor 102 and the second processor 104 are configured with a functionalized polymer coated member that is shown, e.g., as a functionalized polymer coated conveyor belt 120 that runs between the first processor 102 and the second processor 104, according to some embodiments of the present invention. The arrows A1, A2, A3 indicate the movement of the functionalized polymer coated conveyor belt 120. Techniques, including motors, gearing, etc., for running a conveyor belt like element 120 between two processors like elements 102 and 104 are known in the art, and the scope of the invention is not intended to be limited to any particular type or kind thereof either now know or later developed in the future. According to some embodiments of the present invention, the functionalized polymer coated conveyor belt 120 may be made of a mesh material.

The first processor 102 may take the form of a first chamber, tank, cell or column that contains an attachment rich environment generally indicated as 106. The first chamber, tank or column 102 may be configured to receive the mixture or pulp slurry 101 in the form of fluid (e.g., water), the valuable material and the unwanted material in the attachment rich environment 106, e.g., which has a high pH, conducive to attachment of the valuable material. The second processor 104 may take the form of a second chamber, tank, cell or column that contains a release rich environment generally indicated as 108. The second chamber, tank, cell or column 104 may be configured to receive, e.g., water 122 in the release rich environment 108, e.g., which may have a low pH or receive ultrasonic waves conducive to release of the valuable material. Consistent with that stated above, attachment rich environments like that forming part of element environment 106 conducive to the attachment of a valuable material of interest and release rich environments like that forming part of environment 108 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 106 and a corresponding release rich environment like environment 108 based on the separation technology disclosed herein for any particular valuable mineral of interest, e.g., copper, forming part of any particular mixture or slurry pulp.

In operation, the first processor 102 may be configured to receive the mixture or pulp slurry 101 of water, valuable material and unwanted material and the functionalized polymer coated conveyor belt 120 that is configured to attach to the valuable material in the attachment rich environment 106. In FIG. 2, the belt 120 is understood to be configured and functionalized with a polymer coating to attach to the valuable material in the attachment rich environment 106.

The first processor 102 may also be configured to provide drainage from piping 141 of, e.g., tailings 142 as shown in FIG. 2.

The first processor 102 may also be configured to provide an enriched functionalized polymer coated conveyor belt having the valuable material attached thereto, after passing through the attachment rich environment 106. In FIG. 2, the enriched functionalized polymer coated conveyor belt is shown, e.g., as that portion or part 120a of the belt 120 being provisioned from the attachment rich environment 106 in the first processor 102 to the release rich environment 108 in the second processor 104. It is understood that some other portions or parts of the belt 120 may be enriched, including the portion or part immediately leaving the attachment rich environment 106, as well as the portion or part immediately entering the release rich environment 108.

The second processor 14 may be configured to receive the fluid 122 (e.g. water) and the portion 120a of the enriched functionalized polymer coated conveyor belt 120 to release the valuable material in the release rich environment 108.

The second processor 104 may also be configured to provide the valuable material that is released from the enriched functionalized polymer coated member into the release rich environment 108. For example, in FIG. 2 the second processor 104 is shown configured to provide via piping 161 drainage of the valuable material in the form of a concentrate 162.

In FIG. 2, the first processor 102 is configured with the functionalized polymer coated conveyor belt 120 passing through with only two turns inside the attachment rich environment 106. However, embodiments are envisioned in which the first processor 102 may be configured to process the functionalized polymer coated conveyor belt 120 using a serpentine technique for winding or turning the belt 120 one way and another way, back and forth, inside the first processor to maximize surface area of the belt inside the processor 102 and exposure of the belt 120 to the attachment rich environment 106.

Figure 3:
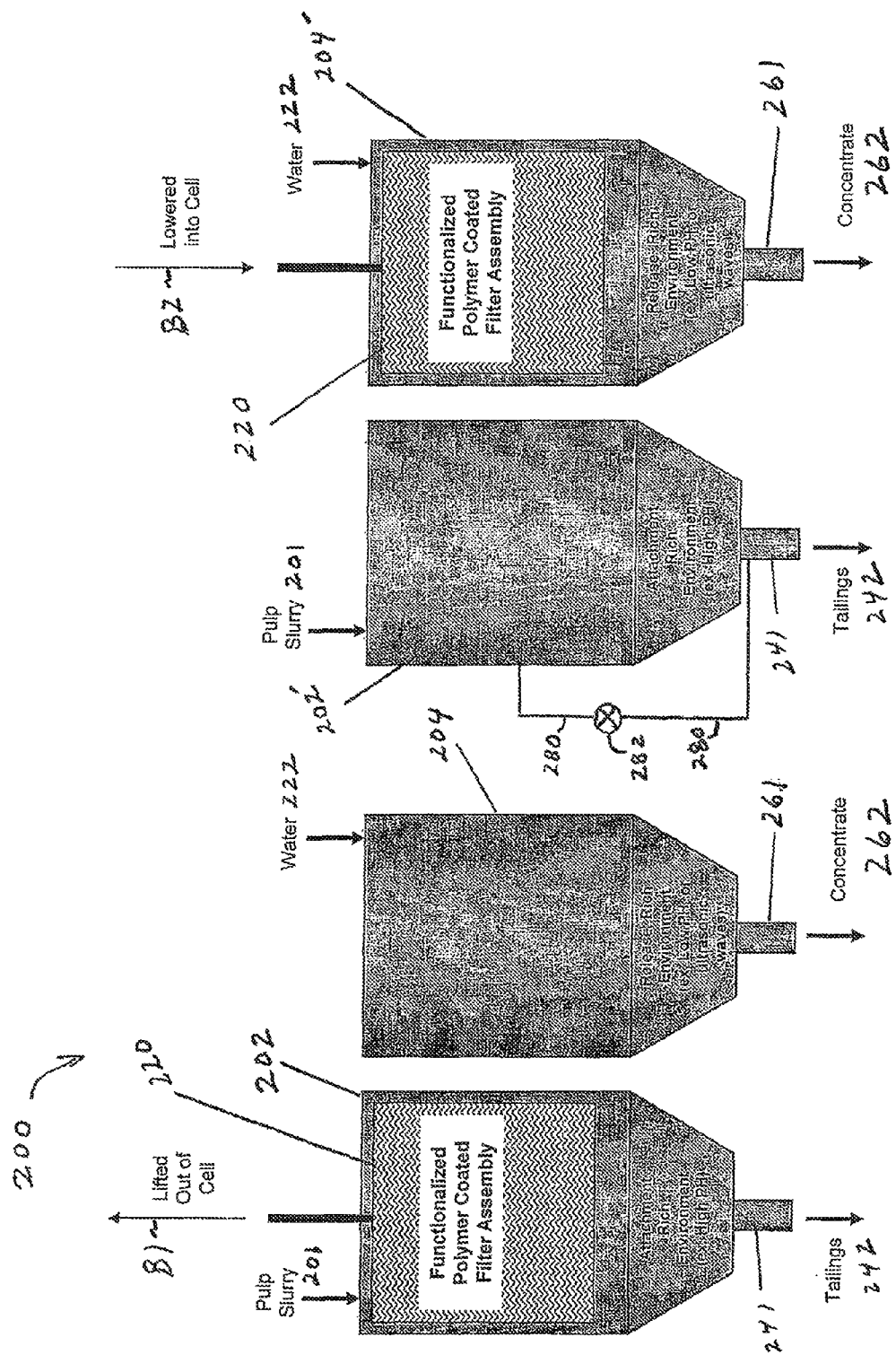
FIG. 3 is diagram of a separation processor configured with a functionalized polymer coated filter assembly for moving between two chambers, tanks or columns in a semi-continuous batch process according to some embodiments of the present invention.

FIG. 3: The Functionalized Polymer Coated Filter

By way of example, FIG. 3 shows the present invention is the form of a machine, device, system or apparatus 200, e.g., for separating valuable material from unwanted material in a mixture 201, such as a pulp slurry, using a first processor 202, 202' and a second processor 204, 204'. The first processor 202 and the second processor 204 are configured to process a functionalized polymer coated member that is shown, e.g., as a functionalized polymer coated collection filter 220 configured to be moved between the first processor 202 and the second processor 204' as shown in FIG. 3 as part of a batch type process, according to some embodiments of the present invention. In FIG. 3, by way of example the batch type process is shown as having two first processor 202, 202' and second processor 204, 204, although the scope of the invention is not intended to be limited to the number of first or second processors. Moreover, embodiments are envisioned using a different number of first and second processor, different types or kinds of processors, as well as different types or kinds of processors both now known or later developed in the future. According to some embodiments of the present invention, the functionalized polymer coated collection filter 220 may take the form of a membrane or a thin soft pliable sheet or layer. The arrow B1 indicates the movement of the functionalized polymer coated filter 220 from the first processor 202, and the arrow B2 indicates the movement of the functionalized polymer coated collection filter 220 into the second processor 202. Techniques, including motors, gearing, etc., for moving a filter like element 220 from one processor to another processor like elements 202 and 204 are known in the art, and the scope of the invention is not intended to be limited to any particular type or kind thereof either now know or later developed in the future.

The first processor 202 may take the form of a first chamber, tank, cell or column that contains an attachment rich environment generally indicated as 206. The first chamber, tank or column 102 may be configured to receive the mixture or pulp slurry 201 in the form of fluid (e.g., water), the valuable material and the unwanted material in the attachment rich environment 206, e.g., which has a high pH, conducive to attachment of the valuable material. The second processor 204 may take the form of a second chamber, tank, cell or column that contains a release rich environment generally indicated as 208. The second chamber, tank, cell or column 204 may be configured to receive, e.g., water 222 in the release rich environment 208, e.g., which may have a low pH or receive ultrasonic waves conducive to release of the valuable material. Consistent with that stated above, attachment rich environments like that forming part of element environment 206 conducive to the attachment of a valuable material of interest and release rich environments like that forming part of environment 208 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 206 and a corresponding release rich environment like environment 208 based on the separation technology disclosed herein for any particular valuable mineral of interest, e.g., copper, forming part of any particular mixture or slurry pulp.

In operation, the first processor 202 may be configured to receive the mixture or pulp slurry 101 of water, valuable material and unwanted material and the functionalized polymer coated collection filter 220 that is configured to attach to the valuable material in the attachment rich environment 206. In FIG. 3, the functionalized polymer coated collection filter 220 is understood to be configured and functionalized with a polymer coating to attach to the valuable material in the attachment rich environment 106.

The first processor 202 may also be configured to provide drainage from piping 241 of, e.g., tailings 242 as shown in FIG. 3.

The first processor 202 may also be configured to provide an enriched functionalized polymer coated collection filter having the valuable material attached thereto, after soaking in the attachment rich environment 106. In FIG. 3, the enriched functionalized polymer coated collection filter 220 is shown, e.g., being provisioned from the attachment rich environment 206 in the first processor 202 to the release rich environment 208 in the second processor 204.

The second processor 204 may be configured to receive the fluid 222 (e.g. water) and the enriched functionalized polymer coated collection filter 220 to release the valuable material in the release rich environment 208.

The second processor 204 may also be configured to provide the valuable material that is released from the enriched functionalized polymer coated collection filter 220 into the release rich environment 208. For example, in FIG. 3 the second processor 204 is shown configured to provide via piping 261 drainage of the valuable material in the form of a concentrate 262.

The first processor 202' may also be configured with piping 280 and pumping 280 to recirculate the tailings 242 back into the first processor 202'. The scope of the invention is also intended to include the second processor 204' being configured with corresponding piping and pumping to recirculate the concentrate 262 back into the second processor 204'. Similar recirculation techniques may be implemented for the embodiments disclosed in relation to FIGS. 1-2 above.

The scope of the invention is not intended to be limited to the type or kind of batch process being implemented. For example, embodiments are envisioned in which the batch process may include the first and second processors 202, 204 being configured to process the enriched functionalized polymer coated collection filter 220 in relation to one type or kind of valuable material, and the first and second processors 202', 204' being configured to process the enriched functionalized polymer coated collection filter 220 in relation to either the same type or kind of valuable material, or a different type or kind of valuable material. Moreover, the scope of the invention is intended to include batch processes both now known and later developed in the future.

Figure 4:
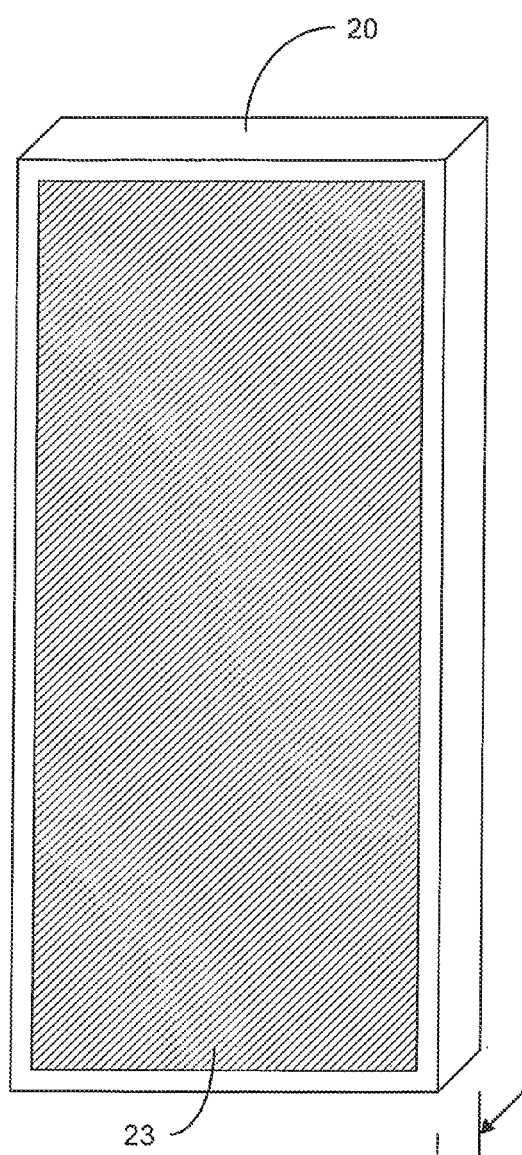
FIG. 4 is an illustration of an impeller according to some embodiments of the present invention.
Figure 5:
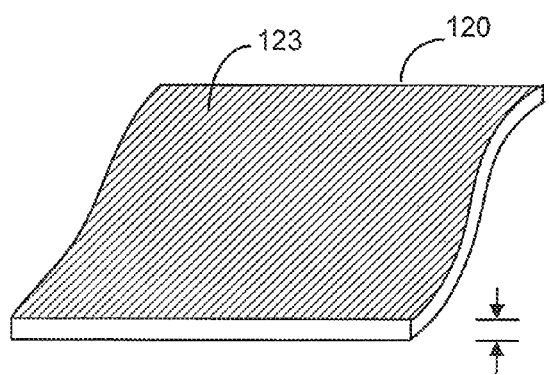
FIG. 5 is an illustration of a section of a conveyor belt according to some embodiments of the present invention.
Figure 6:
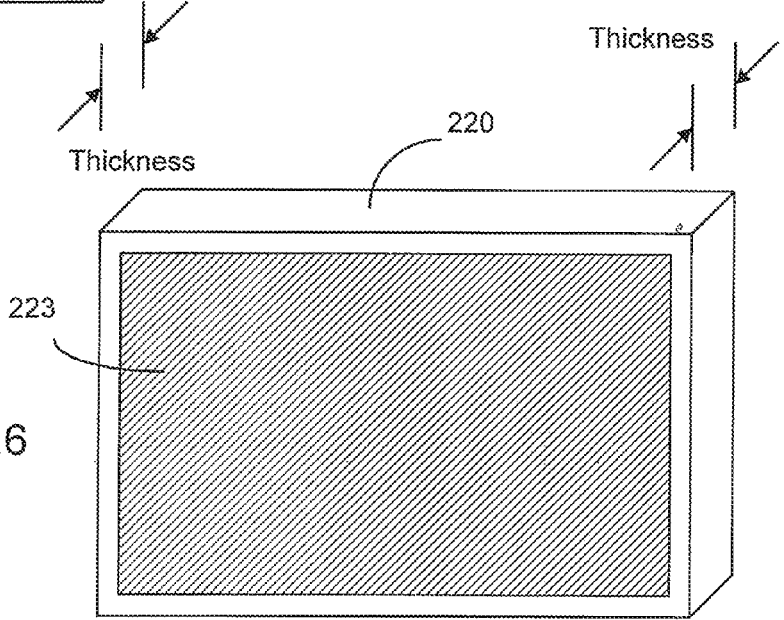
FIG. 6 is an illustration of a filter according to some embodiments of the present invention.

In order to further clarify the term "functionalized polymer" as applied to the coated impeller 20 (FIG. 1a), the coated conveyor belt 120 (FIG. 2) and the collection filter 220 (FIG. 3), various surfaces to be coated are illustrated in FIGS. 4-6. The various physical structures of the surfaces to be coated are illustrated in FIGS. 7a-7f, and some embodiments of the functionalized polymer are depicted in FIGS. 8a, 8b, 8c, 9a, 9b and 9c.

By way of example, the polymer, according to some embodiments of the present invention, at least can be functionalized to attract particles in two different ways.

Figure 8C:
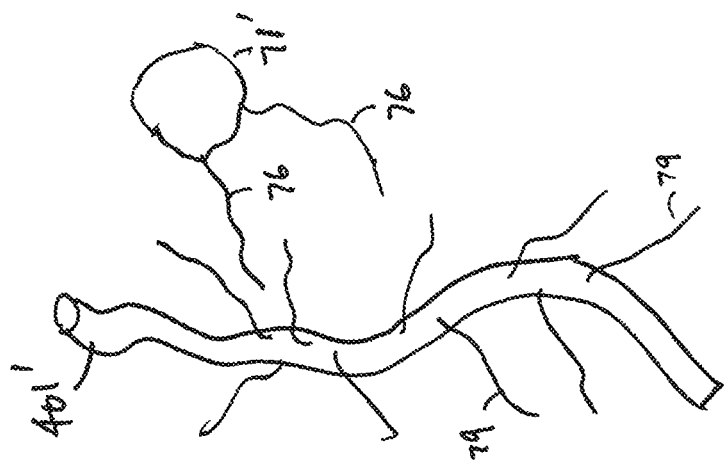
FIG. 8c illustrates a plurality of hydrophobic molecules attached to a fiber for attracting non-mineral particles according to some embodiments of the present invention.

1. The polymer surface has a plurality of molecules 73 (FIGS. 8a, 9a) having a functional group 78 (FIGS. 8a, 8b) to attract mineral particles 72 (FIGS. 8a, 9a).

2. The polymer surface has a plurality of molecules 79 (FIGS. 8b, 9b, 9c, 9d) rendering the surface hydrophobic in order to attract mineral particles 71, 71' (FIGS. 8b, 9b, 9c, 9d). Molecules 79 represent siloxane functional groups. The siloxane functional groups may be provided by one or more of dimethyl siloxane, dimethylvinyl-terminated; polydimethylsiloxane; and dimethyl, methylhydrogen siloxane. The siloxane functional groups may be provided by dimethyl siloxane, hydrogen-terminated.

Polymer Surface Having Functional Groups

The term "polymer" in this disclosure means a large molecule made of many units of the same or similar structure linked together. In some embodiments of the present invention, the polymer surface on a filter has a plurality of molecules 73 (FIGS. 8a, 9a) having a functional group 78 (FIGS. 8a, 8b) to attract mineral particles 72 (FIGS. 8a, 9a). In these embodiments, the unit can be a monomer or an oligomer which forms the basis of, for example, polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, polydimethylsiloxane and other organic or inorganic polymers. Thus, the synthetic material can be hard or rigid like plastic or soft and flexible like an elastomer. While the physical properties of the filter can vary, the surface of the filter is chemically functionalized to provide a plurality of functional groups to attract mineral particles. The terms "valuable material" and "mineral particle" are used herein interchangeably. It is possible to use a molecule or molecular segment 76 (FIG. 8a, 9a) to attach a functional group 78 to the polymer surface. In general, the molecule 76 can be a hydrocarbon chain, for example, and the functional group 78 can be ionic for attracting a mineral, such as copper to the surface 74. A xanthate, for example, has both the functional group 78 and the molecular segment 76 to be incorporated into the polymer that is used to make or coat the surface. A functional group 78 is also known as a collector that is either ionic or non-ionic. The ion can be anionic or cationic. An anion includes, but not limited to, oxyhydryl, such as carboxylic, sulfates and sulfonates, and sulfhydral, such as xanthates and dithiophosphates. Other molecules or compounds that can be used to provide the function group 78 include thionocarboamates, thioureas, xanthogens, monothiophosphates, hydroquinones and polyamines. Similarly, a chelating agent can be incorporated into the polymer as a collector site for attaching to a mineral, such as copper. A surface having a functionalized polymer is also referred to herein as synthetic surface.

Polymer Having Molecules to Render a Surface Hydrophobic

In some embodiments of the present invention, at least the surface of a filter surface is functionalized so that the surface is hydrophobic. It is possible to functionalize a polymer surface to have a plurality of molecules 79 (FIGS. 8b, 8c, 9b, 9c) to render the surface hydrophobic. The molecules 79 may comprise a siloxane functional group.

In chemistry, hydrophobicity is the physical property of a molecule (known as a hydrophobe) that is repelled from a mass of water. Hydrophobic molecules tend to be non-polar and, thus, prefer other neutral molecules and non-polar solvents. Hydrophobic molecules in water often cluster together. According to thermodynamics, matter seeks to be in a low-energy state, and bonding reduces chemical energy. Water is electrically polarized, and is able to form hydrogen bonds internally, which gives it many of its unique physical properties. But, since hydrophobes are not electrically polarized, and because they are unable to form hydrogen bonds, water repels hydrophobes, in favor of bonding with itself. It is this effect that causes the hydrophobic interaction.

The hydrophobic effect is the observed tendency of non-polar substances to aggregate in aqueous solution and exclude water molecules. It can be observed as the segregation and apparent repulsion between water and non-polar substances. The hydrophobic interaction is mostly an entropic effect originating from the disruption of hydrogen bonds between molecules of liquid water by the non-polar solute. A hydrocarbon chain or a similar non-polar region or a big molecule is incapable of forming hydrogen bonds with water. The introduction of such a non-hydrogen bonding surface into water causes disruption of the hydrogen bonding network between water molecules. By aggregating together, nonpolar molecules reduce the surface area exposed to water and minimize their disruptive effect.

Froth flotation is a process for selectively separating hydrophobic materials from hydrophilic. The process has been adapted and applied to a wide variety of materials to be separated, and additional collector agents, including surfactants and synthetic compounds have been adopted for various applications.

In mining operations, froth flotation is a process for separating minerals from gangue by taking advantage of differences in their hydrophobicity. Hydrophobicity differences between valuable minerals and waste gangue are increased through the use of surfactants and wetting agents. The selective separation of the minerals makes processing complex (that is, mixed) ores economically feasible. The flotation process is used for the separation of a large range of sulfides, carbonates and oxides prior to further refinement. Phosphates and coal are also upgraded (purified) by flotation technology. Froth flotation commences by comminution (that is, crushing and grinding), which is used to increase the surface area of the ore for subsequent processing. The ore include the desired minerals and other unwanted materials, know a gangue. The process of grinding the ore into a fine power is known as liberation. The fine powder ore is then mixed with water to form a slurry. The desired mineral is rendered hydrophobic by the addition of a surfactant or collector chemical. The particular chemical depends on which mineral is being refined. This slurry (more properly called the pulp) of hydrophobic mineral particles and hydrophilic gangue particles is then placed in a flotation column or horizontal pipeline wherein the concentrated mineral is separated from the tailings containing the gangue. To be effective on a given ore slurry, the collectors are chosen based upon their selective wetting of the types of particles to be separated. A good collector will adsorb, physically or chemically, with one of the types of particles. In a flotation circuit for mineral concentration, various flotation reagents are added to a mixture of ore and water (called pulp) in a conditioning tank. The flow rate and tank size are designed to give the minerals enough time to be activated. The conditioner pulp is fed to a bank of rougher cells which remove most of the desired minerals as a concentrate. The rougher pulp passes to a bank of scavenger cells where additional reagents may be added. The scavenger cell froth is usually returned to the rougher cells for additional treatment, but in some cases may be sent to special cleaner cells. The scavenger pulp is usually barren enough to be discarded as tails. More complex flotation circuits have several sets of cleaner and re-cleaner cells, and intermediate re-grinding of pulp or concentrate. Because of a number of other factors, as much as 15% of the liberated minerals are not recovered and are discarded as gangue.

Collectors

Collectors either chemically bond (chemisorption) on a hydrophobic mineral surface, or adsorb onto the surface in the case of, for example, coal flotation through physisorption. Collectors increase the natural hydrophobicity of the surface, increasing the separability of the hydrophobic and hydrophilic particles. The hydrophobic particles of interest, according to the present invention, are depicted as particles 71', 72' in FIGS. 8b, 8c, 9b and 9c.

FIGS. 4, 5 and 6: Impellers, Conveyor Belts and Filters

By way of example, the impeller 20 (FIG. 1) has a collection area 23 to support the functionalized polymer (FIG. 4). The conveyor belt 120 (FIG. 2) has a collection area 123 to support the functionalized polymer (FIG. 5). The filter 220 (FIG. 3) has a collection area 223 to support the functional polymer (FIG. 6). The collection area 23, 123 and 223 can take many forms and have various surface features (FIGS. 7a-7f) to attract the mineral particles of interest, when the impeller 20, conveyor belt 120 and the filter 220 are made contact with a mixture or pulp slurry 11 (FIG. 1), 101 (FIG. 2), 201 (FIG. 3) that includes water and valuable material.

FIGS. 7a-7f: Surface Features

Figure 7A:
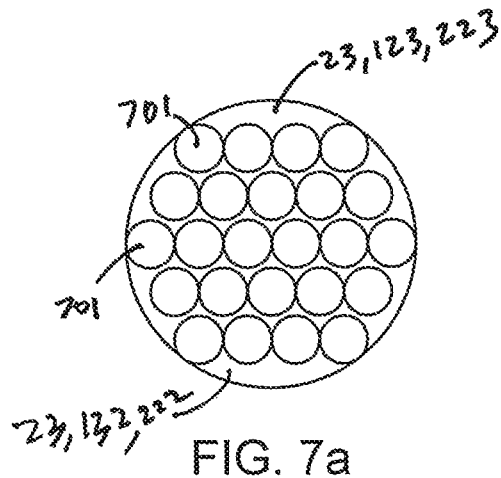
FIGS. 7a-7f illustrates various surface features of the impeller, conveyor belt and filter according to some embodiments of the present invention.
Figure 7B:
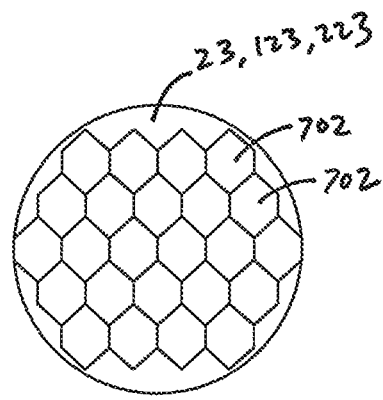
Figure 7C:
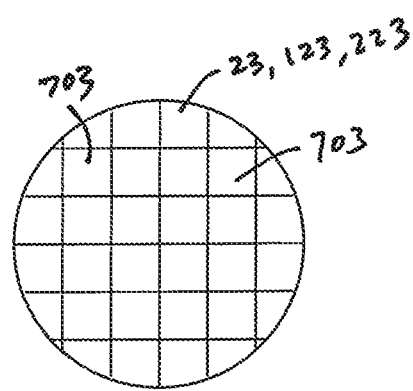
Figure 7D:
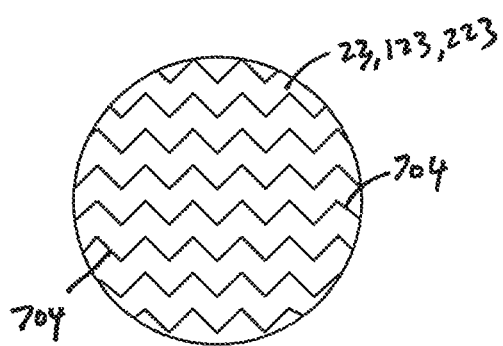
Figure 7E:
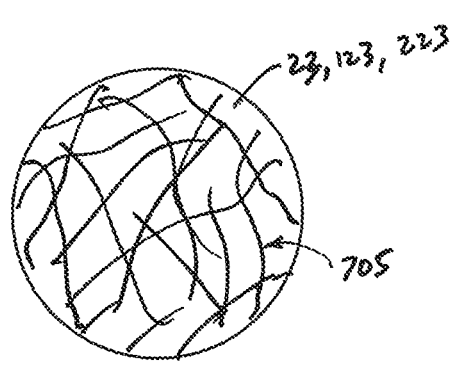
Figure 7F:
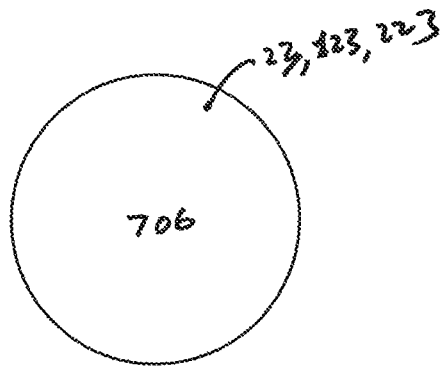

By way of example, each of the collection areas 23, 123 and 223 (FIGS. 4-6) may have a plurality of openings to allow the pulp slurry 11 (FIG. 1), 101 (FIG. 2), 201 (FIG. 3) to pass through while collecting at least part of the valuable material in the pulp slurry. The surface inside an opening and the surfaces or edges around the opening will be provided with the functional groups to attract the mineral particles. Those surfaces are referred to as collection surfaces. For example, the openings on the collection areas 23, 123 and 223 can take the form of holes or cylindrical passage ways 701 as shown in FIG. 7*a*. The openings on the collection areas 23, 123 and 223 can take the form of hexagonal passage ways 702 arranged like honeycomb, as shown in FIG. 7*b*. The collection areas 23, 123 and 223 can have a rectangular grid 703, as shown in FIG. 7*c*. The collection areas 23, 123 and 223 may comprise a stack of wavy sheets 704*a* shown in FIG. 7*d*. The collection areas 23, 123 and 223 may comprise an irregular arrangement of fiber-like structures 705 as shown in FIG. 7*e*. The collection areas 23, 123 and 223 may comprise a plain surface 706 as shown in FIG. 7*f*. The plain surface 06 may be a smooth surface, a paper-like surface or matted surface, without larger structures. The collection area 23, 123 and 223 can be made of a synthetic material, such as a polymer functionalized for attracting the mineral particles. Alternatively, only the collection surfaces are coated with such a polymer. In a different embodiment of the present invention, the collection area 223 comprises a panel, such as a glass panel, a ceramic panel and a metal sheet, wherein one or both sides of the panel has a plain surface 706. In yet another embodiment of the present invention, the impeller 20 and the filter 220 comprise a collection of synthetic bubbles or beads as shown in FIGS. 12*a*-12*b*.

FIGS. 8*a*-9*c*: Surface Molecules

Figure 8B:
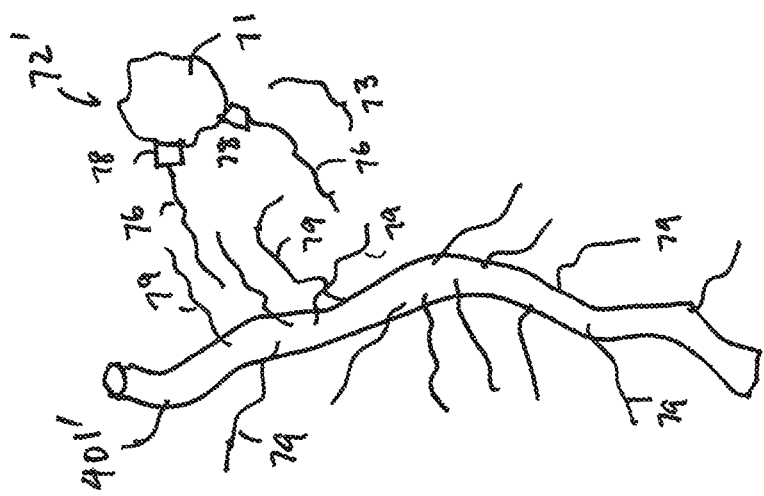
FIG. 8b illustrates a plurality of hydrophobic molecules attached to a fiber for attracting mineral particles, according to some embodiments of the present invention.
Figure 8A:
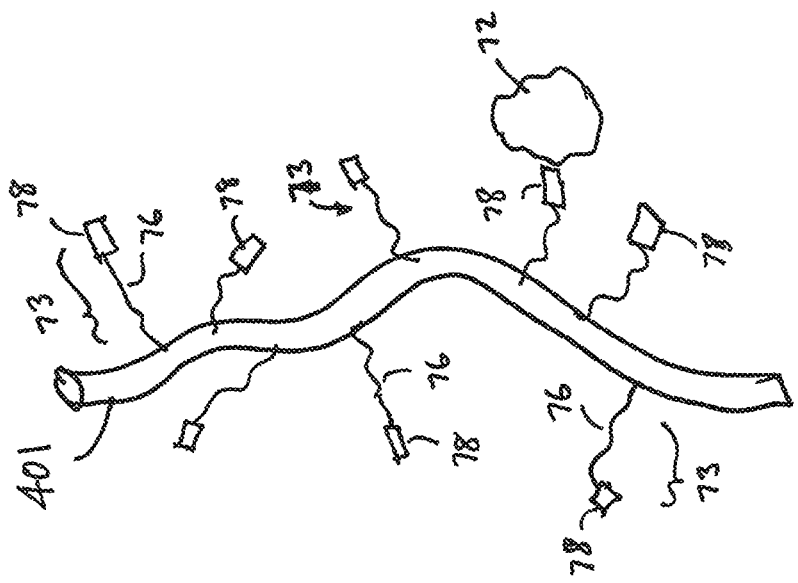
FIG. 8a illustrates a plurality of functional groups attached to a fiber for attracting mineral particles according to some embodiments of the present invention, according to some embodiments of the present invention.

By way of example, the fiber-like structures 705 (FIG. 7*e*) can be functionalized so that they become attached to molecules 73 (FIGS. 8*a*, 8*b*). The fiber-like structures 705 as shown in FIG. 7*e* can be made of individual fibers 401, 401' as shown in FIG. 8*a*-8*c*. In one embodiment of the present invention, the fiber 401 (FIG. 8*a*) can be made of a polymer that has a plurality of molecules 73 to provide the functional group 78 and the attaching molecular segment 76. A xanthate, for example, has both the functional group 78 and the molecular segment 76 to be incorporated into the polymer that is used to make the fiber 401. A functional group 78 is also known as a collector that is ionic or non-ionic to attract mineral particles 72. The ion can be anionic or cationic. An anion includes, but not limited to, oxyhydryl, such as carboxylic, sulfates and sulfonates, and sulfhydral, such as xanthates and dithiophosphates. Other molecules or compounds that can be used to provide the function group 78 include thionocarboamates, thioureas, xanthogens, monothiophosphates, hydroquinones and polyamines. In another embodiment of the present invention, the fiber 401 is coated with polymer that has the molecules 73 to provide the functional group 78 and the attaching molecular segment 76. With such a coating, the fiber 401 can be made of glass, ceramic, metal, nylon, cotton or a different polymer. A diagram of the fiber 401 and the attached molecules 73 is shown in FIG. 8*a*.

In a different embodiment of the present invention, the fiber 401' (FIG. 8*b*) can be made of a polymer that has a plurality of molecules 79 to render the fiber 401' (and thus the collection areas 23, 123 and 223 of FIGS. 4, 5, 6) hydrophobic. The polymer can be a hydrophobic material such as polystyrene, poly(d,l-lactide), poly(dimethylsiloxane), polypropylene, polyacrylic, polyethylene, etc. The polymer can also be a hydrophobically-modified polymer, such as hydrophobically-modified ethyl hydroxyethyl cellulose. Alternatively, the fiber 401' can be made of glass, ceramic, metal, nylon, cotton or other fabric materials and coated with hydrophobic molecules, such as a siloxane functional group in a silicone gel. The molecules 79 cause the fiber 401' to become hydrophobic. As such, a hydrophobically-modified mineral particle 72' can be attracted to the hydrophobic fiber 401'. The hydrophobically-modified, or wetted, mineral particle 72' comprises a mineral particle 71 and one or more molecules 73 attached thereon. The molecule 73, or collector, has a functional group 78 attached to the mineral particle 71 and a hydrophobic chain or molecular segment 76. A diagram showing the attraction between the hydrophobic chain or molecular segments 76 and the hydrophobic fiber 401' is shown in FIG. 8*b*. It should be understood that the particles 72' may be non-mineral and can be some harmful particles in a body of water. Furthermore, the hydrophobic fiber 401' can also be used to attract non-mineral particles. For example, if a non-mineral particle 71' has one or more hydrophobic chains or molecular segments 76, the non-mineral particle 71' is also attracted to the hydrophobic fiber 401'. A diagram showing the attraction between non-mineral particles 71' and the hydrophobic fiber 401' is shown in FIG. 8*c*. Thus, the hydrophobic fiber 401' can be used in a filter, impeller or conveyor belt (similar to those shown in FIGS. 4-6) for water-pollution control, water purification, etc.

The surfaces and edges around the openings or surface structures 701, 702, 703, 704 (FIGS. 7*a*-7*d*) can be functionalized to provide the molecules 73 (FIGS. 9*a*, 9*b*). The exposed surfaces and edges around the openings or surface structures 701, 702, 703, 704 are represented by surface portions 403, 403' as shown in FIGS. 9*a*-9*c*. The length L of the surface portions 403, 403' can be equal to the thickness of the impeller 20, conveyor belt 120 and filter 220 (FIGS. 4-6). As with the fiber 401 as shown in FIG. 8*a*, the surface portion 403 can be made of a polymer that has a plurality of molecules 73 to provide the functional group 78 and the attaching molecular segment 76. In a different embodiment, the surface portion 403 is coated with polymer that has the molecules 73 to provide the functional group 78 and the attaching molecular segment 76. The surface portion 403 can be made of glass, ceramic, metal, nylon, cotton or a different polymer. The functional group 78 is used to attract mineral particles 72. A diagram of the surface portion 403 and the attached molecules 73 is shown in FIG. 9*a*.

In a different embodiment of the present invention, the surface portion 403' can be made of a polymer having a plurality of molecules 79 that render the surface portion 403' (and thus the collection areas 23, 123 and 223 of FIGS. 4, 5, 6) hydrophobic. The molecules 79 may comprise siloxane functional groups. As with the hydrophobic fiber 401' as shown in FIGS. 8*b* and 8*c*, the polymer can be a hydrophobic material such as polystyrene, poly(d,l-lactide), poly(dimethylsiloxane), polypropylene, polyacrylic, polyethylene, etc. The polymer can also be a hydrophobically-modified polymer, such as hydrophobically-modified ethyl hydroxyethyl cellulose. Alternatively, the surface portion 403' can be made of glass, ceramic, metal, nylon, cotton or other fabric materials and coated with hydrophobic molecules, such as polysiloxanes, alkylsilane and fluoroalkylsilane. The molecules 79 cause the surface portion 403' to become hydrophobic. As such, a hydrophobically-modified mineral particle 72' is attracted to the hydrophobic surface portion 403'. A diagram showing the attraction between the molecular segments 76 and the hydrophobic surface portion 403' is shown in FIG. 9*b*. It should be understood that the particles 72' may be non-mineral and can be some harmful particles in a body of water. Furthermore, the hydrophobic surface portion 403' can also be used to attract non-mineral particles. For example, if a non-mineral particle 71' has one or more hydrophobic chains or molecular segments 76, the non-mineral particle 71' is also attracted to the hydrophobic surface portion 403'. A diagram showing the attraction between the non-mineral particles 71' and the hydrophobic surface portion 403' is shown in FIG. 9c. Thus, a filter, impeller or conveyor belt (similar to those shown in FIGS. 4-6) that has hydrophobic surface portions 403' can also be used for water-pollution control, water purification, etc. to rid of hydrophobically-modified particles 72' which may not be a mineral of interest, but some metal harmful to the environment.

The treatment of plain surface 706 (FIG. 7f) can be made similar to the surface portions 403, 403' as shown in FIGS. 9a-9c. That is, the plain surface 706 can be functionalized to provide a functional group 78 as shown in FIG. 9a. The plain surface 706 can also be functionalized to be hydrophobic, as shown in FIGS. 9b and 9c.

It should be understood that, when the collection area 23 of the impeller 20 (FIG. 4), the collection area 123 of the conveyor belt 120 (FIG. 5) and the collection area 223 of the filter 220 (FIG. 6) are functionalized to be hydrophobic, the pulp slurry 11 (FIG. 1a), the pulp slurry 101 (FIG. 2) and the pulp slurry 201 (FIG. 3) must be mixed with collector molecules such as xanthates so that the mineral particles 71 (FIGS. 8b and 9b) in the slurry may be hydrophobically modified with the collector molecules 73 to become wetted mineral particles 72'.

Figure 10A:
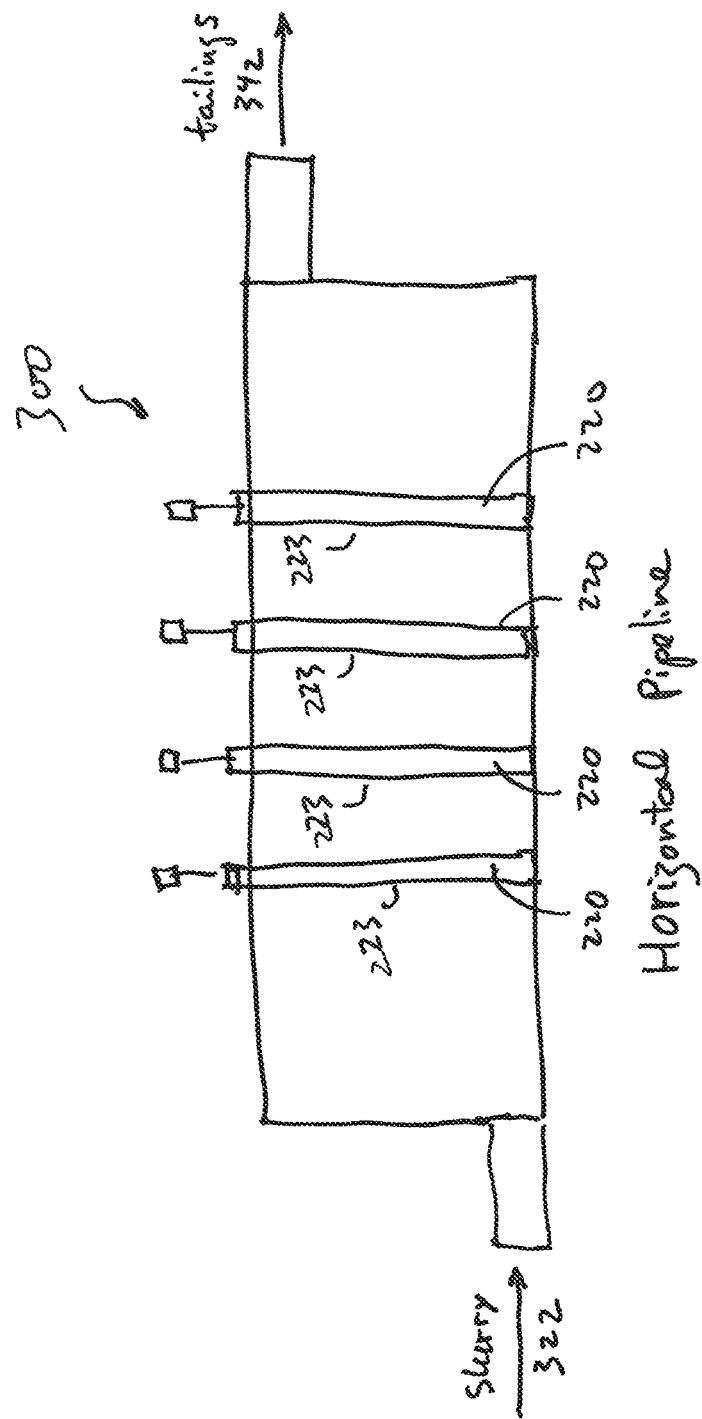
FIG. 10a illustrates a plurality of filters placed in a horizontal pipeline to collect mineral particles, according to some embodiments of the present invention.
Figure 10B:
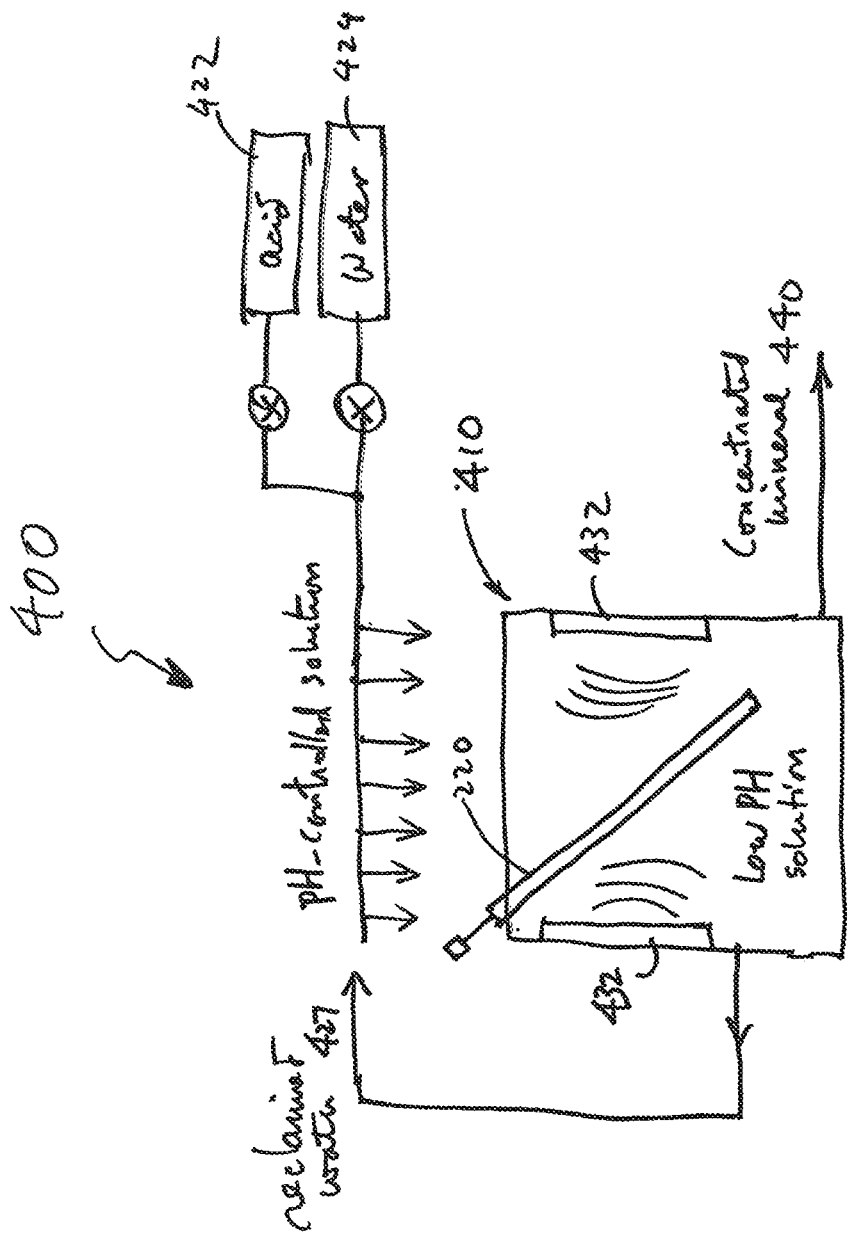
FIG. 10b illustrates a release apparatus configured to release mineral particles from a filter, according to some embodiments of the present invention.

In a different embodiment of the present invention, the impeller 20 (FIG. 1a), the conveyor belt 120 (FIG. 2) and the filter 220 (FIG. 3) are used in a horizontal pipeline for mineral separation. Furthermore, a group of filters 220 can be used in a first processor 202 as shown in FIG. 3. By way of example, a plurality of filters 220 are placed into a horizontal pipeline 300 to collect the valuable material in the slurry 322, as shown in FIG. 10a. As the slurry passes through the filters 220, some of the mineral particles in the slurry will become attached to collection area 223 and the openings (see FIGS. 7a-7e). With such an arrangement, one or more of the filters 220 can be taken out of the horizontal pipeline 300 for mineral releasing (see FIG. 10b) while other filters 220 continue to collect the mineral particles. The tailings 342 can be discharged or transported to a tailings pond or the like (see FIG. 11). The attached mineral particles on the filter 220 can be released in a release rich environment with a low pH solution and/or ultrasonic agitation. The pH value of the low pH solution can be 0 to 7, for example. As shown in FIG. 10b, the filter 220 with collected mineral particles can be placed in a releasing apparatus 410 to be washed with a mixture of acid and water provided by water container 424 and acid container 422. One or more ultrasonic sources 432 may be used to shake loose the attached mineral particles from the filter 220. In one embodiment of the present invention, the filter 200 comprises a panel, such as a glass panel, a ceramic panel, a metal sheet, a plastic sheet, wherein the panel is coated with a synthetic material comprising a plurality of molecules configured to attract the mineral particles. The surface of the panel can be a plain surface as shown in FIG. 7f. The reclaimed water 427 can be channeled back for reuse. The concentrated mineral 440 can be taken out of the releasing apparatus 410.

In many releasing environments, the pH value is lower than the pH value for mineral attachment. It should be noted that, however, when the valuable material is copper, for example, it is possible to provide a lower pH environment for the attachment of mineral particles and to provide a higher pH environment for the releasing of the mineral particles from the synthetic beads or bubbles. In general, the pH value is chosen to facilitate the strongest attachment, and a different pH value is chosen to facilitate release. Thus, according to some embodiments of the present invention, one pH value is chosen for mineral attachment, and a different pH value is chosen for mineral releasing. The different pH could be higher or lower, depending on the specific mineral and collector.

Applications

The scope of the invention is described in relation to mineral separation, including the separation of copper from ore.

By way of example, applications are envisioned to include

Rougher/scavenger separation cells in the production stream, replacing the traditional flotation machines.

Tailings scavenger cells are used to scavenge the unrecovered minerals from a tailings stream.

Tailings cleaning cell is used to clean unwanted material from the tailings stream before it is sent to the disposal pond.

Tailings reclamation machine that is placed in the tailings pond to recover valuable mineral that has been sent to the tailings pond.

It should be understood that, the filter 220 (FIGS. 3, 6) can also be used for mineral recovery in a tailings point. By way of example, one or more filters 220 may be placed in a tailings pond 350 to collect the mineral particles in the tailings 342. In order to increase the contact between the collection area 223 and the tailings 342 in the pond 350, it is possible to move the filters 220 back and forth as indicated by arrows A and B. It is understood that when the collection area 223 of the filter 220 is functionalized to be hydrophobic, collector molecules such as xanthates should be added into the tailings 342 so that the mineral particles in the tailings can be wetted.

It should be understood that the synthetic beads and filters according to the present invention, whether functionalized to have a collector or functionalized to be hydrophobic, are also configured for use in oilsands separation—to separate bitumen from sand and water in the recovery of bitumen in an oilsands mining operation.

Other types or kinds of valuable material or minerals of interest, include gold, molybdenum, etc.

However, the scope of the invention is intended to include other types or kinds of applications either now known or later developed in the future.

FIGS. 12a-14b: Different Embodiments

On the collection areas 23, 123, 223 of the impeller 20, conveyor belt 120 and filter 220 as shown in FIGS. 4-7f, the collection surfaces on the surface structures are coated with a synthetic material having particular molecules to attract mineral particles. In different embodiments of the present invention, the synthetic material can be used to provide those particular molecules on beads or bubbles, or to make the beads or bubbles (see FIGS. 13a-14b). The bubbles or beads that have the particular molecules to attract mineral particles are herein referred to as synthetic bubbles or beads. By way of example, the synthetic beads or bubbles 170 are used in an impeller or a filter to collect mineral particles 72, 72' (see FIGS. 8a-9b, 13a-14b). As shown in FIG. 12a, the impeller uses a cage or the like to contain a plurality of synthetic beads to provide the collection surfaces in the collection area 23. As shown in FIG. 12b, the filter uses a cage or the like to contain a plurality of synthetic beads 170 to provide the collection surfaces in the collection area 223. When the synthetic beads or bubbles 170 are used to collect valuable material in a tailings pond 350 (FIG. 11), they can be put in a sack 320 as shown in FIG. 12c. As with the synthetic material that is used on the collection surfaces 403, 403' (FIGS. 9a-9c), the synthetic material to be used on the synthetic beads or bubbles 170 may have the functional groups 78 to attract the mineral particles 72, or may have the hydrophobic molecules 79 comprising a siloxane functional group.

Figure 13B:
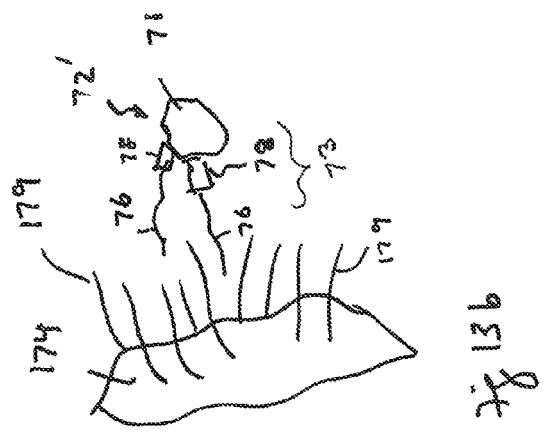
FIG. 13b is an enlarged surface portion of the synthetic bead functionalized to attract wetted mineral particles, according to some embodiments of the present invention.
Figure 13C:
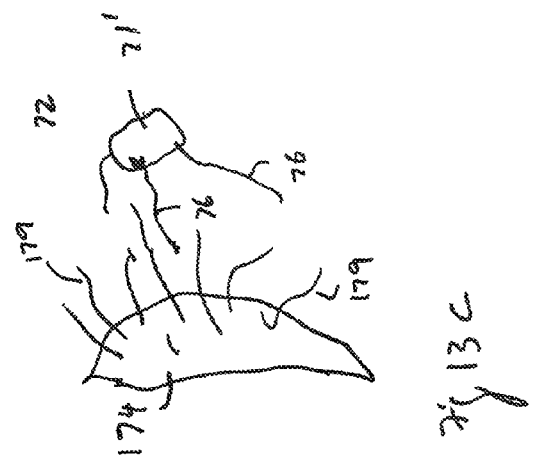
FIG. 13c is an enlarged surface portion of the synthetic bead functionalized to attract non-mineral hydrophobic particles, according to some embodiments of the present invention.
Figure 13A:
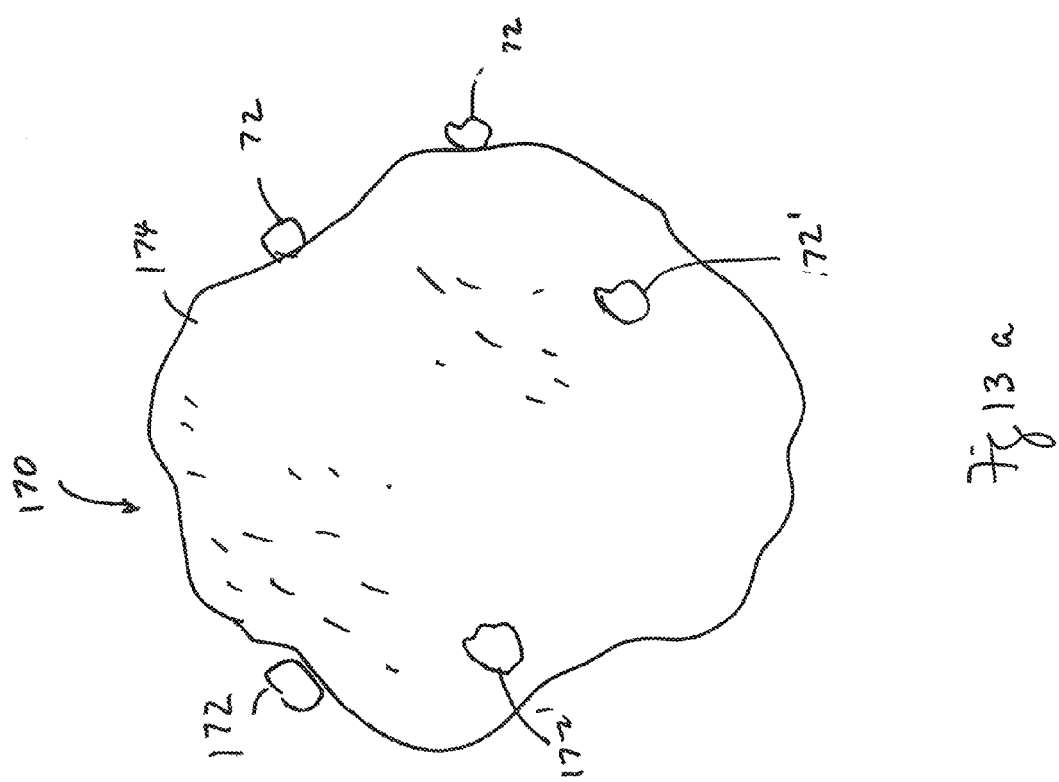
FIG. 13a illustrates a synthetic bead functionalized to attract hydrophobic particles, according to some embodiments of the present invention.

FIG. 13a illustrates a synthetic bead functionalized to attract hydrophobic particles. As shown in FIG. 13a, the synthetic bubble or bead 170 has a solid-phase bead body to provide a bead surface 174. At least the outside part of the bead body is made of a synthetic material, such as a hydrophobic polymer, or a coating of a hydrophobic chemical. As shown in FIGS. 13a and 13b, the surface 174 of the synthetic bubble or bead comprises a plurality of molecules 79 which renders the surface 174 hydrophobic. Molecules 79 may comprise a siloxane functional group. For example, the surface 174 may be a glass surface coated with polysiloxanes which can bind to the hydroxyl group of the glass surface. Polysiloxanes, such as hydroxyl-terminated polydimethysiloxanes, have a silicon-oxygen chain to provide the hydrophobic molecules 79. The hydrophobic particle 72', as shown in FIG. 13b, can be a mineral particle 71 having one or more collectors 73 attached thereto. One end (78) of the collector 73 has an ionizing bond attached to the mineral particle 71. The other end of the collector 73 has a hydrophobic chain 76 which tends to move into the hydrophobic molecules 79. Thus, the hydrophobic particle 72' can be a wetted mineral particle. A collector, such as xanthate, has both the functional group 78 and the molecule 76. The hydrophobic particle 72, as shown in FIG. 13c, can be a particle 71' that has a hydrophobic chain 76. Such particle can be non-mineral related, but it can be arranged to contact with the hydrophobic synthetic bubbles or beads 170 of the present inventions. Likewise, the particle 71 may be non-mineral and can be harmful to the environment. Thus the hydrophobic bubbles or beads 170, according to the present invention, can be used in non-mining applications, such as water-pollution control and water purification. The size of the synthetic bead can be smaller than the minimum size of the mineral particles which is about 150 µm, and can be larger than the maximum size of the mineral particles. In certain applications, the size of the synthetic bead can be 1 cm or larger.

Figure 14B:
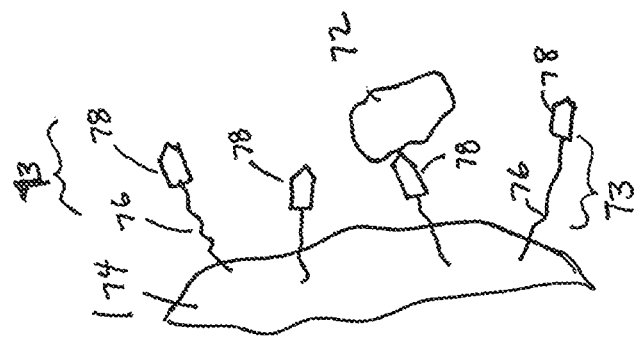
FIG. 14b is an enlarged surface portion of the synthetic bead functionalized to attract mineral particles, according to some embodiments of the present invention.
Figure 14A:
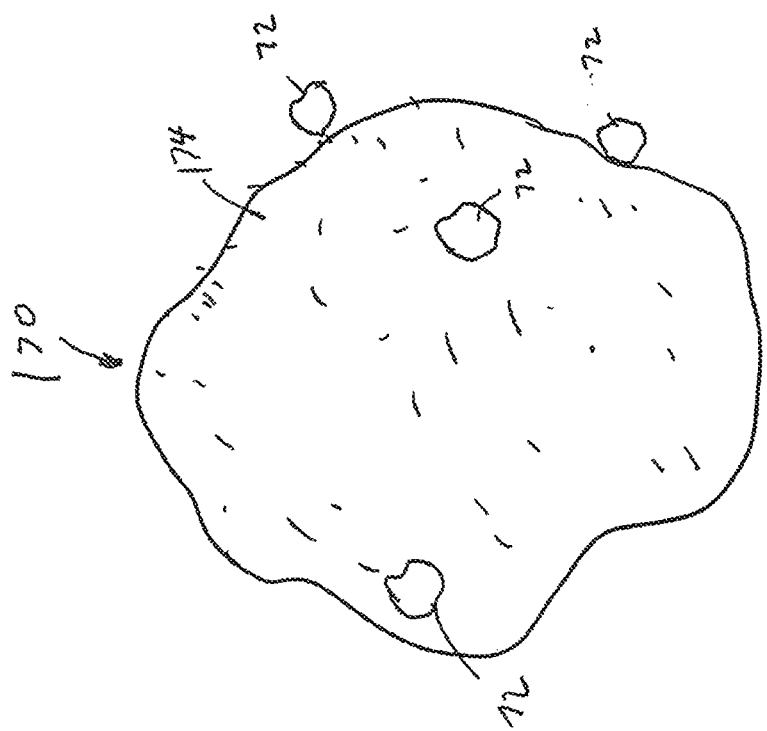
FIG. 14a illustrates a synthetic bead having a functional group to attract mineral particles according to some embodiments of the present invention.

FIG. 14a illustrates a synthetic bead having a functional group to attract mineral particles. The synthetic bead 170 has a bead body to provide a bead surface 174 to attract mineral particles 72. FIG. 14b is an enlarged surface of the synthetic bead functionalized to attract mineral particles. At least the outside part of the bead body is made of a synthetic material, such as polymer, so as to provide a plurality of molecules or molecular segments 76 on the surface 174. The molecule 76 is used to attach a chemical functional group 78 to the surface 174. In general, the molecule 76 can be a hydrocarbon chain, for example, and the functional group 78 can have an anionic bond for attracting a mineral, such as copper to the surface 174. A xanthate, for example, has both the functional group 78 and the molecular segment 76 to be incorporated into the polymer that is used to make the synthetic bead 70. The functional group 78 is also known as a collector that can have a non-ionizing or ionizing bond to attract the mineral particles 72. Similarly, a chelating agent can be incorporated into the polymer as a collector site for attracting a mineral, such as copper.

The releasing of the mineral particles from the synthetic beads can be similar to the releasing of the mineral particles from the impeller, conveyor belt or the filter. For example, after the synthetic beads 170 in the collection area 23 or 223 or in the sack 320 (FIGS. 12a-12c) have collected a certain amount of mineral particles, the synthetic beads 170 can be made contact with a low pH solution and/or subjected to ultrasonic agitation (e.g., FIG. 10b) in order to release the mineral particles. However, a high pH solution can also be used for releasing certain mineral particles while a low pH environment is used for mineral attachment.

According to some embodiments of the present invention, only a portion of the surface of the synthetic bead is functionalized to be hydrophobic. This has the benefits as follows:

1. Keeps too many beads from clumping together—or limits the clumping of beads,
2. Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

According to some embodiments of the present invention, only a portion of the surface of the synthetic bead is functionalized with collectors. This also has the benefits of 1. Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

According to some embodiments of the present invention, one part of the synthetic bead is functionalized with collectors while another part of same synthetic bead is functionalized to be hydrophobic as shown in FIGS. 15a and 15b. As shown in FIG. 15a, a synthetic bead 74 has a surface portion where polymer is functionalized to have collector molecules 73 with functional group 78 and molecular segment 76 attached to the surface of the bead 74. The synthetic bead 74 also has a different surface portion where polymer is functionalized to have hydrophobic molecules 79. In the embodiment as shown in FIG. 15b, the entire surface of the synthetic bead 74 can be functionalized to have collector molecules 73, but a portion of the surface is functionalized to have hydrophobic molecules 79 render it hydrophobic. Molecules 79 may comprise a siloxane functional group.

This "hybrid" synthetic bead can collect mineral particles that are wetted and not wetted.

According to some embodiments of the present invention, the surface of a synthetic bead can be functionalized to have a collector molecule. The collector has a functional group with an ion capable of forming a chemical bond with a mineral particle. A mineral particle associated with one or more collector molecules is referred to as a wetted mineral particle. According to some embodiments of the present invention, the synthetic bead can be functionalized to be hydrophobic in order to collect one or more wetted mineral particles.

THE SCOPE OF THE INVENTION

It should be further appreciated that any of the features, characteristics, alternatives or modifications described regarding a particular embodiment herein may also be applied, used, or incorporated with any other embodiment described herein. In addition, it is contemplated that, while the embodiments described herein are useful for homogeneous flows, the embodiments described herein can also be used for dispersive flows having dispersive properties (e.g., stratified flow).

Although the invention has been described and illustrated with respect to exemplary embodiments thereof, the foregoing and various other additions and omissions may be made therein and thereto without departing from the spirit and scope of the present invention.

What is claimed is:

1. Apparatus comprising:
a collection area or tank having one or more collection surfaces configured to contact with a mixture having water and valuable material, the valuable material having a plurality of mineral particles of interest; and
a synthetic material provided at least on the one or more collection surfaces, the synthetic material having plurality of molecules with a siloxane functional group configured to attract the mineral particles of interest to the collection surfaces, wherein the one or more collection surfaces includes, or forms part of, a conveyor belt also that is driven through the collection area or tank, through a release area or tank, back through the collection area or tank, and the conveyor belt may be made of polyurethane rubber and coated with a silicone gel for collecting the valuable material of interest of a wide range of sizes, including particles far larger than about 500 microns, and wherein the silicone gel takes the form of a product sold in a combination that includes 3-4222 Dielectric Firm Gel Part A and 3-4222 Dielectric Firm Gel Part B.

2. Apparatus according to claim 1, wherein the mixture includes, or takes the form of, a pulp slurry having ground ore with mineral particles of interest forming part thereof, including mineral particles of interest of about 500 microns or larger.

3. Apparatus according to claim 1, wherein the mixture includes chemistry configured to enhance the attraction and/or attachment between the synthetic material having the siloxane functional group and the mineral particles of interest in the mixture.

4. Apparatus according to claim 1, wherein the collection area or tank is configured with one or more stirrers, mixers or agitators for stirring, mixing or agitating the mixture.

5. Apparatus according to claim 1, wherein the release area or tank is configured with one or more broom-like devices for sweeping and/or releasing in whole or in part attached mineral particles of interest from the synthetic material of the collection surfaces.

6. Apparatus according to claim 5, wherein the broom-like device is configured on either or both sides of the conveyor belt.

7. Apparatus according to claim 1, wherein the release area or tank has a corresponding mixture configured to enhance the releasing in whole or in part of the attached mineral particles of interest from the synthetic material of the collection surfaces.

8. Apparatus according to claim 1, wherein the collection area or tank and the release area or tank are separated by a wall.

9. Apparatus according to claim 1, wherein the polyurethane rubber is coated on either or both sides with the silicone gel.

10. Apparatus according to claim 1, wherein the silicone gel includes, or takes the form of, molecules having the siloxane functional group, including a siloxane that is, or takes the form of, a functional group in organosilicon chemistry with the Si—O—Si linkage.

11. Apparatus according to claim 1, wherein the gel comes with two parts, including:
Part A that includes dimethyl siloxane, dimethylvinyl-terminated—68083-19-2; polydimethylsiloxane—63148-62-9; reaction of ethylene glycol and silica—170424-65-4; hydrotreated light naphthenic petroleum distillate—64742-53-6; and
Part B that includes dimethyl siloxane, dimethylvinyl-terminated—68083-19-2; polydimethysiloxane—63148-62-9; dimethyl siloxane, hydrogen-terminated—none; trimethylated silica—68909-20-6; dimethyl, methylhydrogen siloxane—68037-59-2.

12. An apparatus according to claim 1, wherein the one or more collection surfaces is functionalized to be hydrophobic so as to provide a bonding between the collection surface and a mineral particle that is hydrophobic.

13. An apparatus according to claim 1, wherein the one or more collection surfaces comprises a surface made of a polymer and coated with a silicone gel to provide the siloxane functional group.

14. An apparatus according to claim 13, wherein the polymer is naturally hydrophobic or functionalized to be hydrophobic.

15. An apparatus according to claim 13, wherein the polymer is a hydrophobic polymer, including a polydimethylsiloxane.

16. An apparatus according to claim 13, wherein the collection surface rendered hydrophobic by having a coating that contains chemicals with a siloxane functional group.

17. An apparatus according to claim 13, wherein the one or more collection surfaces is coated with hydrophobic silicone polymer including polysiloxane so that the collection surface becomes hydrophobic.

18. The apparatus according to claim 1, wherein the one or more collection surface comprises polymer surfaces and the synthetic material comprise a siloxane derivative.

19. The apparatus according to claim 18, wherein the polymer surfaces comprises polyurethane.

20. The apparatus according claim 1, wherein the synthetic material comprises polysiloxanes.

21. The apparatus according to claim 1, wherein the synthetic material comprises one or more of dimethyl siloxane, dimethylvinyl-terminated; polydimethylsiloxane; and dimethyl, methylhydrogen siloxane.

22. The apparatus according to claim 1, wherein the synthetic material comprise hydroxyl-terminated polydimethylsiloxanes.

23. The apparatus according to claim 1, wherein the one or more collection surfaces comprise a polymer selected from a group consisting of polyamides, polyesters, polyurethanes phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, and polydimethylsiloxane.

24. The apparatus according to claim 1, wherein the one or collection surfaces comprises a polymer from a group consisting of polystyrene, poly(d,l-lactide), poly(dimethylsiloxane), polypropylene, polyacrylic, polyethylene, hydrophobically-modified ethyl hydroxyethyl cellulose polysiloxanes, alkylsilane and fluoroalkylsilane.

25. Apparatus comprising:
a collection area or tank having one or more collection surfaces configured to contact with a mixture having water and valuable material, the valuable material having a plurality of mineral particles of interest; and
a synthetic material provided at least on the one or more collection surfaces, the synthetic material having plurality of molecules with a siloxane functional group configured to attract the mineral particles of interest to the collection surfaces, wherein the one or more collection surfaces includes, or forms part of, a conveyor belt also that is driven through the collection area or tank, through a release area or tank, back through the collection area or tank, and wherein the conveyor belt may be made of polyurethane rubber and coated with a silicone gel for collecting the valuable material of interest of a wide range of sizes, including particles far larger than about 500 microns, wherein the silicone gel includes, or takes the form of, molecules having the siloxane functional group, including a siloxane that is, or takes the form of, a functional group in organosilicon chemistry with the Si—O—Si linkage, and wherein parent siloxanes include, or take the form of, oligomeric and polymeric hydrides with the formulae $H(OSiH_2)_nOH$ and $(OSiH_2)_n$.

26. Apparatus comprising:
a collection area or tank having one or more collection surfaces configured to contact with a mixture having water and valuable material, the valuable material having a plurality of mineral particles of interest; and
a synthetic material provided a east on the one or more collection surfaces, the synthetic material having plurality of molecules with a siloxane functional group configured to attract the mineral particles of interest to the collection surfaces, wherein the one or more collection surfaces includes, or forms part of, a conveyor belt also that is driven through the collection area or tank, through a release area or tank, back through the collection area or tank, and wherein the conveyor belt may be made of polyurethane rubber and coated with a silicone gel for collecting the valuable material of interest of a wide range of sizes, including particles far larger than about 500 microns, wherein the silicone gel includes, or takes the form of, molecules having the siloxane functional group, including a siloxane that is, or takes the form of, a functional group in organosilicon chemistry with the Si—O—Si linkage, and wherein the siloxane includes branched compounds, where the defining feature includes each pair of silicon centers being separated by one oxygen atom.

27. Apparatus according to claim 26, wherein, after being coated on the polyurethane rubber, the silicone gel cures and hardens to as to form part of, and stick to, the polyurethane rubber.

28. Apparatus according to claim 26, wherein the one or more collection surfaces is configured or made substantially of a material that consists of a siloxane-based material in a non-gel form.

29. Apparatus according to claim 26, wherein the one or more collection surfaces includes, or takes the form of, a group consisting of some combination of: a conveyor belt, one or more of an impeller, a filter assembly and/or a flat plate.

\* \* \* \* \*